US008180372B2

(12) United States Patent       (10) Patent No.:     US 8,180,372 B2
    Terashima                    (45) Date of Patent:    *May 15, 2012

(54) POSITIONING SYSTEM, TERMINAL APPARATUS, CONTROL METHOD OF TERMINAL APPARATUS

(75) Inventor: Maho Terashima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 57 days.

This patent is subject to a terminal disclaimer.

(21) Appl. No.: 12/640,526

(22) Filed: Dec. 17, 2009

(65) Prior Publication Data

US 2011/0171971 A1    Jul. 14, 2011

Related U.S. Application Data

(62) Division of application No. 11/545,533, filed on Oct. 11, 2006.

(30) Foreign Application Priority Data

Oct. 11, 2005   (JP) ................................. 2005-296770

(51) Int. Cl.
    H04W 24/00   (2009.01)
    G01S 13/00   (2006.01)
    G01S 19/12   (2010.01)
    H04B 7/185   (2006.01)

(52) U.S. Cl. .................. 455/456.1; 342/357.49; 342/77; 342/358

(58) Field of Classification Search .... 455/456.1–456.6; 342/357.2–357.78, 77, 171
See application file for complete search history.

(56) References Cited

U.S. PATENT DOCUMENTS

| 7,012,563 B1 | 3/2006 | Bustamante et al. |
| 2002/0009974 A1* | 1/2002 | Kuwahara et al. ........... 455/67.6 |
| 2006/0045215 A1* | 3/2006 | Ballantyne et al. .......... 375/344 |

FOREIGN PATENT DOCUMENTS

| EP | 0766097 A1 | 4/1997 |
| EP | 1048959 A2 | 11/2000 |
| JP | 2002-228737 A | 8/2002 |

* cited by examiner

Primary Examiner — George Eng
Assistant Examiner — Chayce Bibbee
(74) Attorney, Agent, or Firm — Global IP Counselors, LLP

(57) ABSTRACT

The terminal apparatus has: base station and terminal error information generating means for generating base station and terminal error information indicating a rate of the base station and terminal frequency difference with respect to the official frequency; geostationary satellite and terminal difference information generating means for generating geostationary satellite and terminal difference information indicating a geostationary satellite and terminal frequency difference; geostationary satellite and terminal error information generating means for generating geostationary satellite and terminal error information indicating a rate of the geostationary satellite and terminal frequency difference with respect to the geostationary satellite frequency; base station frequency error information generating means for generating base station frequency error information indicating a frequency error of a transmitting radio wave from the communication base station based on the base station and terminal error.

6 Claims, 19 Drawing Sheets

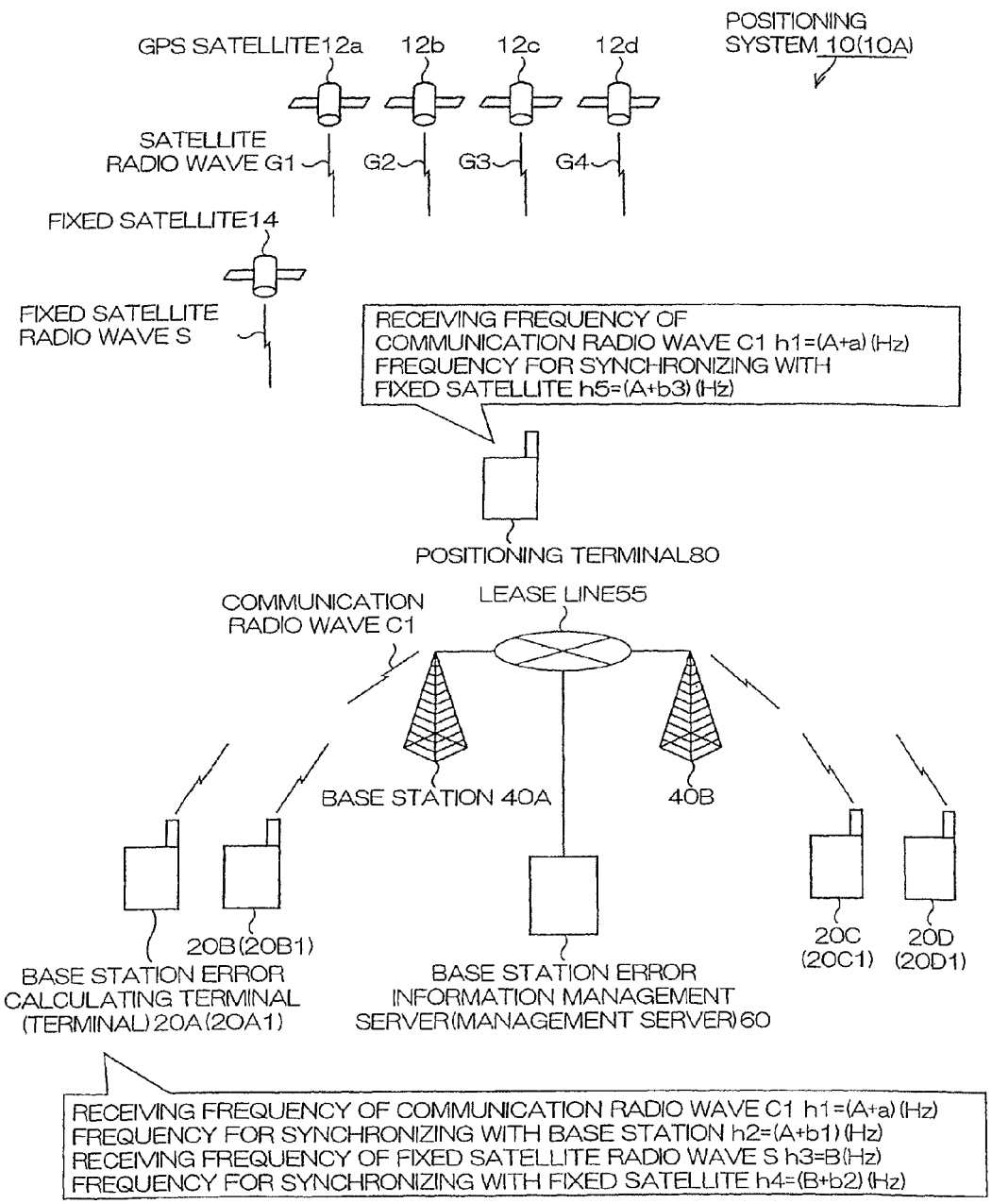

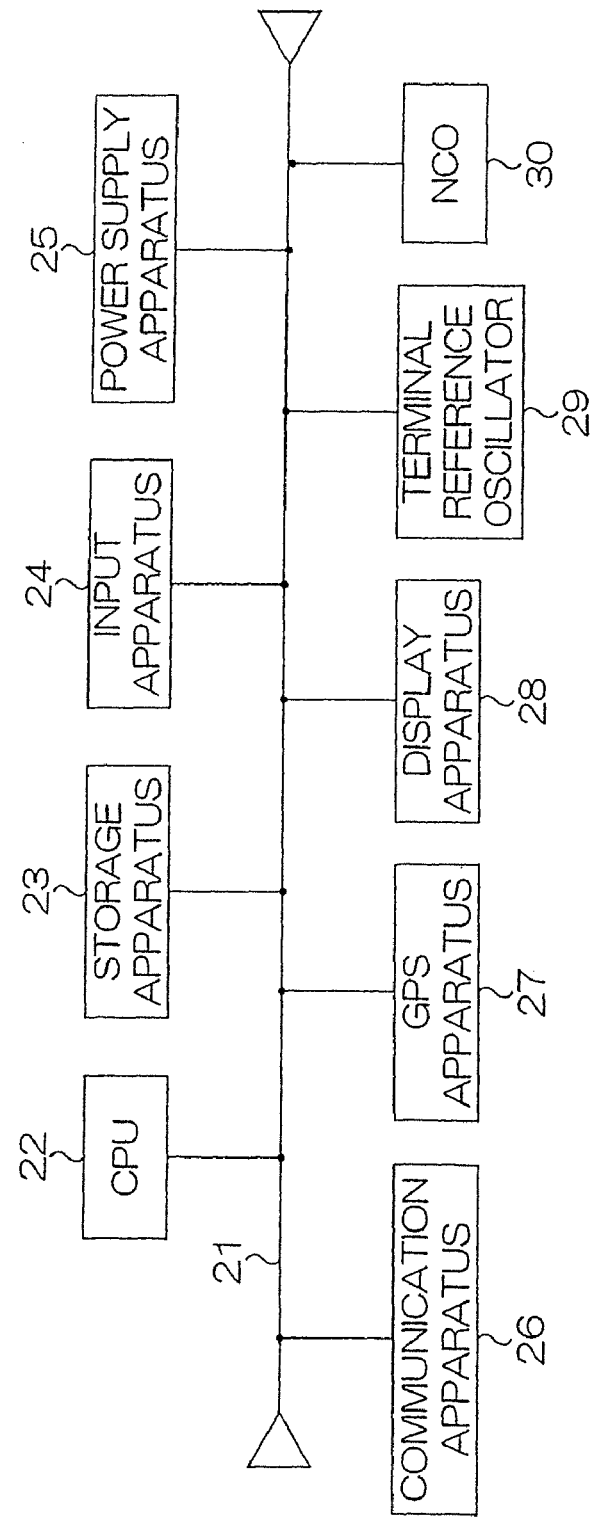
F I G. 2

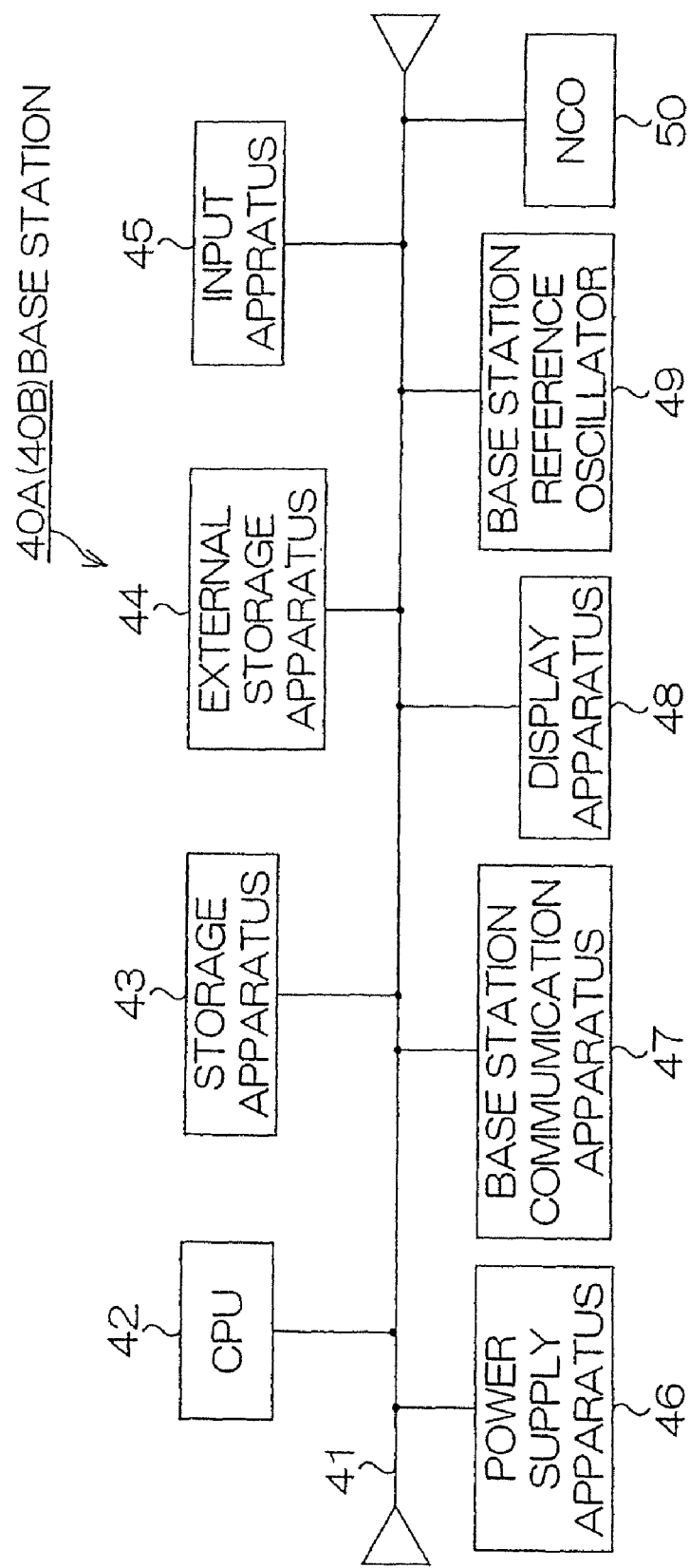
F I G. 3

FIG.7
(a) BASE STATION RADIO WAVE SYNCHRONIZING PURPOSE
FREQUENCY SIGNAL GENERATING PROGRAM 114
FORMULA1 : $h0 \times \alpha1 = h2(A+b1)$
$h0$ : FREQUENCY OF TERMINAL REFERENCE OSCILLATOR
$b1$ : ERROR OF BASE STATION RADIO WAVE SYNCHRONIZING
PURPOSE FREQUENCY CAUSED BY FREQUENCY ERROR OF TERMINAL
REFERENCE OSCILLATOR
(b) 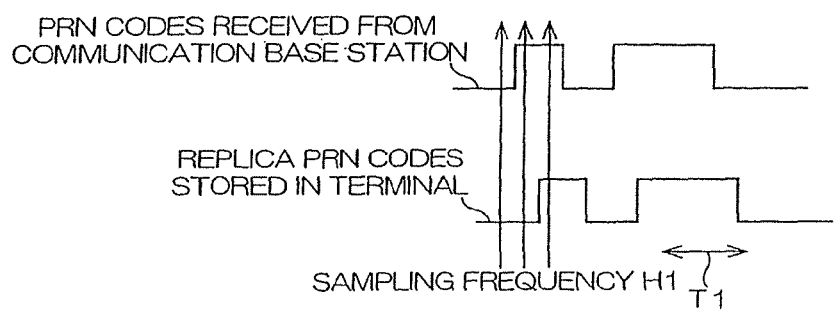
(c) 

FIG.8

(a) WHEN THERE IS NO FREQUENCY ERROR IN COMMUNICATION BASE STATION AND TERMINAL

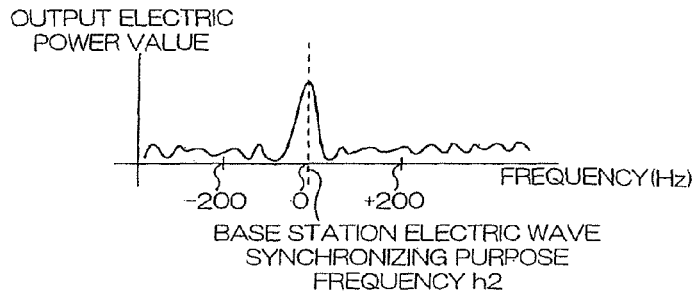

(b) WHEN THERE IS A FREQUENCY ERROR AT LEAST EITHER IN COMMUNICATION BASE STATION OR IN TERMINAL

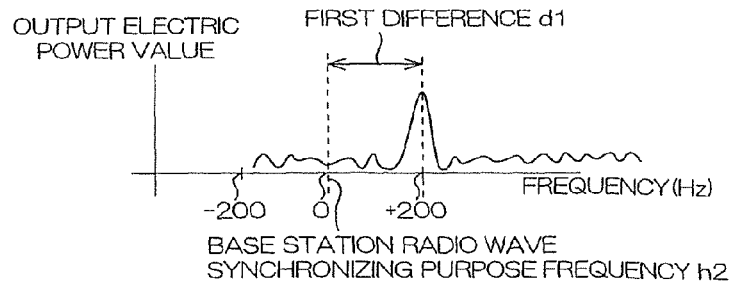

FIG.9

(a) FIRST DIFFERENCE INFORMATION GENERATING PROGRAM 116

FORMULA2 : $d1 = h1 - h2 = (A+a) - (A+b1) = a - b1$ a : ERROR OF BASE STATION RADIO WAVE SYNCHRONIZING PURPOSE FREQUENCY CAUSED BY FREQUENCY ERROR OF BASE STATION REFERENCE OSCILLATOR (b) FIRST ERROR INFORMATION GENERATING PROGRAM 118

FORMULA3 : $err1 = d1/A = a/A - b1/A$

FIG.10

(a) FIXED SATELLITE RADIO WAVE SYNCHRONIZING PURPOSE
FREQUENCY SIGNAL GENERATING PROGRAM 122

FORMULA4 : $h0 \times \alpha2 = h4(B+b2)$ h0 : FREQUENCY OF TERMINAL REFERENCE OSCILLATOR
b2 : ERROR OF FIXED SATELLITE RADIO WAVE SYNCHRONIZING
    PURPOSE FREQUENCY CAUSED BY FREQUENCY ERROR OF
    TERMINAL REFERENCE OSCILLATOR (b) SECOND DIFFERENCE INFORMATION GENERATING PROGRAM 124

FORMULA5 : $d2 = h4-h3 = (B+b2)-B = b2$ (c) SECOND ERROR INFORMATION GENERATING PROGRAM 126

FORMULA6 : $err2 = d2/B = b2/B$ (d) BASE STATION ERROR INFORMATION GENERATING PROGRAM 128

FORMULA7 : $err3 = a/A = err1 + b1/A = err1 + err2$

∵ $b1/A = b2/B$

F I G. 1 1
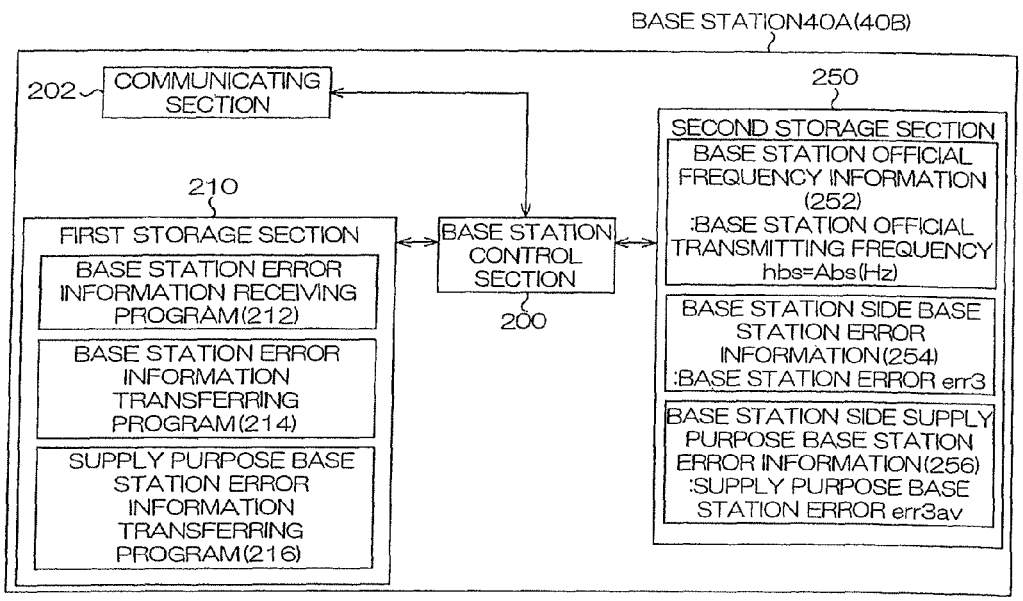
F I G. 1 2
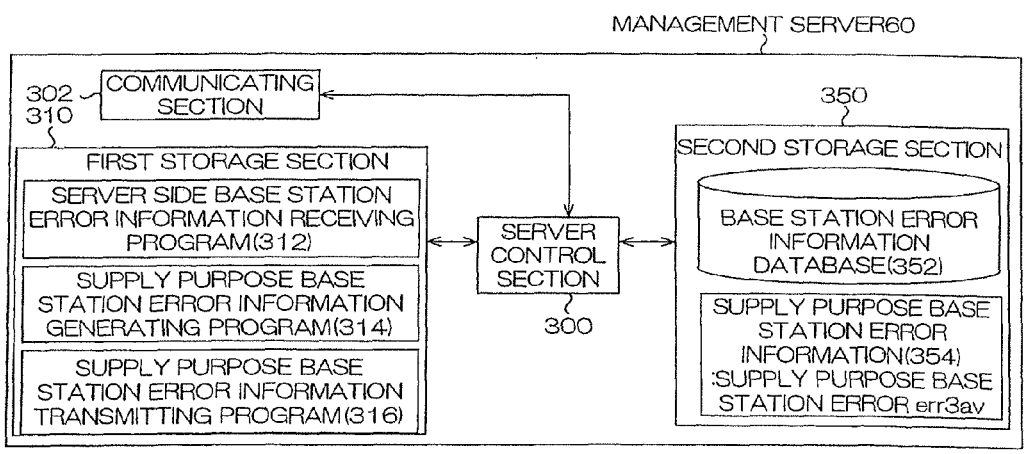

F I G. 1 3

BASE STATION ERROR INFORMATION DATABASE352

| BASE STATION40A | | BASE STATION40B | |
|---|---|---|---|
| BASE STATION ERROR INFORMATION | RECEIVING TIME | BASE STATION ERROR INFORMATION | RECEIVING TIME |
| err3A1 | 2005/10/01/01:00:01 | err3B1 | 2005/10/01/01:00:02 |
| err3A2 | 2005/10/01/01:00:10 | err3B2 | 2005/10/01/01:00:15 |
| err3A3 | 2005/10/01/02:00:10 | err3B3 | 2005/10/01/02:00:15 |
| err3A4 | 2005/10/01/03:00:01 | err3B4 | 2005/10/01/03:00:15 |
| err3A5 | 2005/10/02/01:00:01 | err3B5 | 2005/10/02/01:00:15 |
| ... | ... | ... | ... |
| err3An | 2005/10/30/12:00:01 | err3Bn | 2005/10/30/14:00:01 |

F I G. 1 4

SUPPLY PURPOSE BASE STATION ERROR INFORMATION
GENERATING PROGRAM314

FORMULA8 : $err3av = (err3A1 + err3A2 + err3A3 + \cdots + err3An) \div n$

F I G. 1 6

(a) BASE STATION RADIO WAVE SYNCHRINIZING PURPOSE
FREQUENCY SIGNAL GENERATING PROGRAM 414

FORMULA9 : $h0 \times \alpha2 = h5(A+b3)$ h0 : FREQUENCY OF POSITIONING TERMINAL REFERENCE OSCILLATOR
b3 : ERROR OF BASE STATION RADIO WAVE SYNCHTONIZING PURPOSE
FREQUENCY CAUSED BY FREQUENCY ERROR OF POSITIONING
TERMINAL REFERENCE OSCILLATOR (b) FREQUENCY DIFFERENCE INFORMATION GENERATING PROGRAM 416

FORMULA10 : $d3 = h1 - h5 = (A+a) - (A+b3) = a - b3$
a : ERROR OF BASE STATION RADIO WAVE SYNCHRONIZING PURPOSE
FREQUENCY CAUSED BY FREQUENCY ERROR OF BASE STATION
REFERENCE OSCILATOR (c) FREQUENCY ERROR INFORMATION GENERATING PROGRAM 418

FORMULA11 : $err4 = d3/A = a/A - b3/A$ (d) FREQUENCY ERROR CORRECTING PROGRAM 422

FORMULA12 : $h6 = h0 \times (1 - err4 - err3av)$

∵ $a/A = err3av$ (e) SEARCH CORE FREQUENCY SETTING PROGRAM 426

FORMULA13 : $h7 = h0 \times (1 - err4 - err3av) \times \alpha3$

F I G. 2 1
TERMINAL SIDE REFERECE OSCILLATOR ERROR CORRECTING PROGRAM132
FORMULA14 : h0×(1-err2)
F I G. 2 2
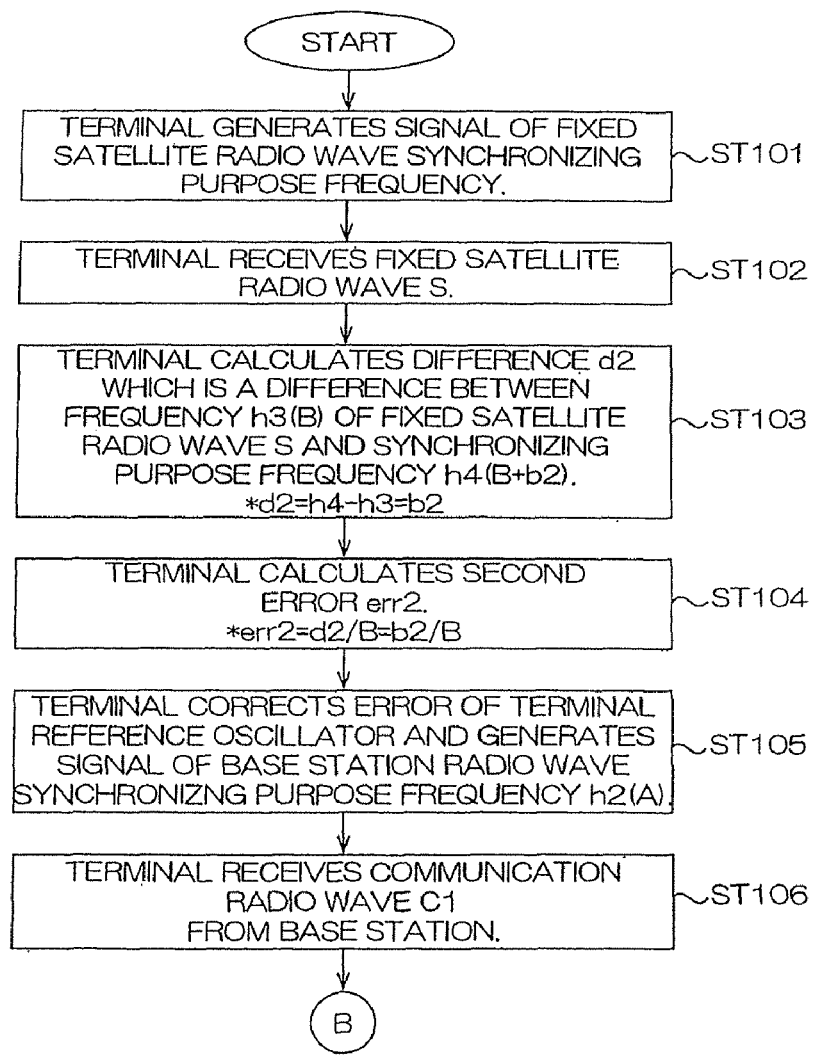

POSITIONING SYSTEM, TERMINAL APPARATUS, CONTROL METHOD OF TERMINAL APPARATUS

CROSS-REFERENCE TO THE RELATED APPLICATIONS

This is a divisional application of U.S. patent application Ser. No. 11/545,533 which claims priority under 35 U.S.C. §119 to Japanese Patent Application No. 2005-296770 filed on Oct. 11, 2005. The entire disclosure of U.S. patent application Ser. No. 11/545,533 and Japanese Patent Application No. 2005-296770 is hereby incorporated by reference.

BACKGROUND

1. Technical Field

The present invention relates to a positioning system which positions a current position based on signals from positioning satellites, a terminal apparatus, a control method of the terminal apparatus 2. Related Art Conventionally, a GPS (Global Positioning System) system which positions a current position of a terminal apparatus using radio waves from satellites has been actually used.

In such a system, a terminal apparatus receives radio waves (hereinafter, referred to as satellite radio waves) from three or more of GPS satellites, and calculates distance (pseudo range) between each GPS satellite and the terminal apparatus. A current position can then be positioned based on the positions of each GPS satellite on satellite orbit and the aforementioned pseudo range.

To capture satellite radio waves, frequency of satellite radio waves to be received by the terminal apparatus must be expected in consideration of Doppler shift due to relative movement between each GPS satellite and the terminal apparatus, and the expected frequency must be searched.

However, frequency of a reference oscillator (also referred to as local oscillator) of the terminal apparatus may deviate from the reference frequency (hereinafter, referred to as frequency deviation of reference oscillator) due to change in temperature. Since a synchronizing purpose signal for synchronizing with satellite radio waves is generated based on frequency of the reference oscillator, frequency deviation of the reference oscillator causes frequency deviation of the synchronizing purpose signal. This causes deviation between an expected frequency of the satellite radio waves (which means frequency after a signal is received by an antenna of the terminal apparatus and then down-converted within the terminal apparatus) and frequency of the synchronizing purpose signal. Accordingly, if frequency deviation of the reference oscillator occurs, it takes longer time to capture satellite radio waves than the case where frequency deviation of the reference oscillator does not occur.

On the other hand, a technology to expect frequency error of the terminal apparatus using the frequency of transmitting signals from a cellular phone base station (hereinafter, referred to as base station), and use the expected frequency error to capture satellite radio waves has been proposed (e.g., JP-A-2002-228737 (FIG. 1 and the like)).

However, in the above-mentioned prior art, it is assumed that frequency of transmitting signals of a base station is managed with high accuracy. But the fact is that management of frequency accuracy of transmitting signals of the base station may be insufficient.

Accordingly, there is a problem that when frequency errors of the terminal apparatus are expected based on transmitting signals with original frequency errors of the base station, the expected values may include errors at the same degree as the frequency errors of the transmitting signals of the base station, and the time to capture satellite radio waves may thus not be sufficiently reduced.

SUMMARY

Therefore, an advantage of some aspects of the invention is to provide a positioning system capable of preventing increase in the time to capture satellite radio waves due to transmitting radio waves of the base station with frequency error, a terminal apparatus, a control method of the terminal apparatus.

In order to achieve the above object, a positioning system according to a first aspect of the invention includes: a communication base station; a terminal apparatus capable of communicating with the communication base station; and a positioning terminal for receiving satellite radio waves from positioning satellites and positioning, wherein, the terminal apparatus has: official frequency information storage means for storing official frequency information indicating an official frequency of a transmitting radio wave from the communication base station; base station synchronizing purpose frequency signal generating means for generating a base station synchronizing purpose frequency signal for receiving the transmitting radio wave; transmitting radio wave receiving means for receiving the transmitting radio wave; base station and terminal difference information generating means for generating base station and terminal difference information indicating a base station and terminal frequency difference, which is a frequency difference between a receiving frequency of the transmitting radio wave and a frequency of the base station synchronizing purpose frequency signal; base station and terminal error information generating means for generating base station and terminal error information indicating a rate of the base station and terminal frequency difference with respect to the official frequency; geostationary satellite frequency information storage means for storing geostationary satellite frequency information indicating a geostationary satellite frequency, which is a frequency of a geostationary satellite radio wave transmitted from a geostationary satellite; geostationary satellite synchronizing purpose frequency signal generating means for generating a geostationary satellite synchronizing purpose frequency signal for receiving the geostationary satellite radio wave; geostationary satellite radio wave receiving means for receiving the geostationary satellite radio wave; geostationary satellite and terminal difference information generating means for generating geostationary satellite and terminal difference information indicating a geostationary satellite and terminal frequency difference, which is a frequency difference between a receiving frequency of the geostationary satellite radio wave and a frequency of the geostationary satellite synchronizing purpose frequency signal; geostationary satellite and terminal error information generating means for generating geostationary satellite and terminal error information indicating a rate of the geostationary satellite and terminal frequency difference with respect to the geostationary satellite frequency; base station frequency error information generating means for generating base station frequency error information indicating a frequency error of a transmitting radio wave from the communication base station based on the base station and terminal error information and the geostationary satellite and terminal error information; and base station frequency error information transmitting means for transmitting the base station frequency error information to the communication base station, the communication base station has: base station frequency error information transmitting means for transmitting the base station frequency error information in response to a request from the positioning terminal, and the positioning terminal has: positioning side official frequency information storage means for storing official frequency information indicating an official frequency of a transmitting radio wave from the communication base station; positioning side base station synchronizing purpose frequency signal generating means for generating a base station synchronizing purpose frequency signal for receiving the transmitting radio wave; positioning side transmitting radio wave receiving means for receiving the transmitting radio wave; base station and positioning terminal difference information generating means for generating base station and positioning terminal difference information indicating a base station and positioning terminal frequency difference, which is a frequency difference between a receiving frequency of the transmitting radio wave and a frequency of the base station synchronizing purpose frequency signal; base station and positioning terminal error information generating means for generating base station and positioning terminal error information indicating a rate of the base station and positioning terminal frequency difference with respect to the official frequency; base station frequency error information receiving means for receiving the base station frequency error information from the communication base station; positioning side frequency error correcting means for correcting a frequency error of a reference oscillator of the positioning terminal based on the base station frequency error information and the base station and positioning terminal error information; and satellite radio wave receiving means for receiving the satellite radio waves.

With the structure according to the first aspect of the invention, the terminal apparatus can generate the base station and terminal error information using the base station and terminal error information generating means. The base station and terminal error information reflects both a frequency error of the communication base station and that of the terminal apparatus.

In addition, the terminal apparatus can generate the geostationary satellite and terminal error information using the geostationary satellite and terminal error information generating means. It can be considered that there is no frequency error of the geostationary satellite frequency since it is managed with high accuracy. Moreover, unless the terminal apparatus moves, there is no relative movement between the geostationary satellite and the terminal apparatus, and thus no Doppler shift of the geostationary satellite frequency occurs. Accordingly, the geostationary satellite and terminal error information reflects only a frequency error of the terminal apparatus.

Moreover, the terminal apparatus can generate the base station frequency error information using the base station frequency error information generating means. As described above, the base station and terminal error information reflects both a frequency error of the communication base station and that of the terminal apparatus. The geostationary satellite and terminal error information reflects only a frequency error of the terminal apparatus. This allows calculation of a frequency error of a transmitting radio wave of the communication base station based on the base station and terminal error information and the geostationary satellite and terminal error information, and generation of the base station frequency error information.

Furthermore, the terminal apparatus can transmit the base station frequency error information to the communication base station using the base station and terminal error information transmitting means.

Accordingly, the positioning terminal becomes able to obtain the base station frequency error information, and thus it is possible to prevent increase in the time to capture satellite radio waves due to a transmitting radio wave of the communication base station with a frequency error.

The communication base station can transmit the base station frequency error information using the base station frequency error information transmitting means in response to a request from the positioning terminal.

The positioning terminal can generate the base station and positioning terminal error information using the base station and positioning terminal error information generating means. The base station and positioning terminal error information reflects both a frequency error of the communication base station and that of the positioning terminal.

In addition, the positioning terminal can correct a frequency error of a reference oscillator of the positioning terminal using the positioning side frequency error correcting means based on the base station frequency error information and the base station and positioning terminal error information. As described above, the base station frequency error information is information indicating a frequency error of a transmitting radio wave of the communication base station. The base station and positioning terminal error information reflects both a frequency error of the communication base station and that of the positioning terminal. This allows calculation of only a frequency error of the positioning terminal and correction of a frequency error of a reference oscillator of the positioning terminal based on the base station frequency error information and the base station and positioning terminal error information. Here, in the case of correcting a frequency error of a reference oscillator of the positioning terminal based on only the base station and positioning terminal error information, effects of a frequency error of the communication base station cannot be reduced. Alternatively, in the case of correcting a frequency error of a reference oscillator of the positioning terminal based on the base station frequency error information and the base station and positioning terminal error information, effects of a frequency error of the communication base station can be reduced.

This allows the positioning terminal to prevent increase in the time to capture satellite radio waves due to a transmitting radio wave of a communication base station with a frequency error.

In order to achieve the above object, a positioning system according to a second aspect of the invention includes: a communication base station; a terminal apparatus capable of communicating with the communication base station; and a positioning terminal for receiving satellite radio waves from positioning satellites and positioning, wherein, the terminal apparatus has: geostationary satellite frequency information storage means for storing geostationary satellite frequency information indicating a geostationary satellite frequency, which is a frequency of a geostationary satellite radio wave transmitted from a geostationary satellite; geostationary satellite synchronizing purpose frequency signal generating means for generating a geostationary satellite synchronizing purpose frequency signal for receiving the geostationary satellite radio wave; geostationary satellite radio wave receiving means for receiving the geostationary satellite radio wave; geostationary satellite and terminal difference information generating means for generating geostationary satellite and terminal difference information indicating a geostationary satellite and terminal frequency difference, which is a frequency difference between a receiving frequency of the geostationary satellite radio wave and a frequency of the geostationary satellite synchronizing purpose frequency signal; geostationary satellite and terminal error information generating means for generating geostationary satellite and terminal error information indicating a rate of the geostationary satellite and terminal frequency difference with respect to the geostationary satellite frequency; frequency error correcting means for correcting a frequency error of a reference oscillator of the terminal apparatus based on the geostationary satellite and terminal error information; official frequency information storage means for storing official frequency information indicating an official frequency of a transmitting radio wave from the communication base station; base station synchronizing purpose frequency signal generating means for generating a base station synchronizing purpose frequency signal for receiving the transmitting radio wave; transmitting radio wave receiving means for receiving the transmitting radio wave; base station and terminal difference information generating means for generating base station and terminal difference information indicating a base station and terminal frequency difference, which is a frequency difference between a receiving frequency of the transmitting radio wave and a frequency of the base station synchronizing purpose frequency signal; base station and terminal error information generating means for generating base station and terminal error information indicating a rate of the base station and terminal frequency difference with respect to the official frequency; and base station error information transmitting means for transmitting the base station and terminal error information as base station frequency error information indicating a frequency error of transmitting radio wave from the communication base station to the communication base station, the communication base station has: base station frequency error information transmitting means for transmitting the base station frequency error information in response to a request from the positioning terminal, and the positioning terminal has: positioning side official frequency information storage means for storing official frequency information indicating an official frequency of a transmitting radio wave from the communication base station; positioning side base station synchronizing purpose frequency signal generating means for generating a base station synchronizing purpose frequency signal for receiving the transmitting radio wave; positioning side transmitting radio wave receiving means for receiving the transmitting radio wave; base station and positioning terminal difference information generating means for generating base station and positioning terminal difference information indicating a base station and positioning terminal frequency difference, which is a frequency difference between a receiving frequency of the transmitting radio wave and a frequency of the base station synchronizing purpose frequency signal; base station and positioning terminal error information generating means for generating base station and positioning terminal error information indicating a rate of the base station and positioning terminal frequency difference with respect to the official frequency; base station frequency error information receiving means for receiving the base station frequency error information from the communication base station; positioning side frequency error correcting means for correcting a frequency error of a reference oscillator of the positioning terminal based on the base station frequency error information and the base station and positioning terminal error information; and satellite radio wave receiving means for receiving the satellite radio waves.

With the structure according to the second aspect of the invention, the terminal apparatus can generate the geostationary satellite and terminal error information using the geostationary satellite and terminal error information generating means. The geostationary satellite and terminal error information reflects only a frequency error of the terminal apparatus.

In addition, the terminal apparatus can correct a frequency error of a reference oscillator of the terminal apparatus using the frequency error correcting means based on the geostationary satellite and terminal error information.

Moreover, the terminal apparatus can generate the base station and terminal error information using the base station and terminal error information generating means. As described above, since a frequency error of a reference oscillator of the terminal apparatus can be corrected using the frequency error information, it is possible to make the base station and terminal error information reflect only a frequency error of the communication base station.

Furthermore, the terminal apparatus can transmit the base station and terminal error information to the communication base station as base station frequency error information which indicates a frequency error of a transmitting radio wave of the communication base station using the base station frequency error information transmitting means.

Accordingly, the positioning terminal becomes able to obtain the base station frequency error information, and thus it is possible to prevent increase in the time to capture satellite radio waves due to a transmitting radio wave of the communication base station with a frequency error.

The base station can transmit the base station frequency error information using the base station frequency error information transmitting means in response to a request from the positioning terminal.

The positioning terminal can correct a frequency error of a reference oscillator of the positioning terminal using the positioning side frequency error correcting means based on the base station frequency error information and the base station and positioning terminal error information.

This allows the positioning terminal to prevent increase in the time to capture satellite radio waves due to a transmitting radio wave of a communication base station with a frequency error.

A third aspect of the invention is a positioning system with a structure according to any of the first and the second aspect of the invention, wherein the terminal apparatus exists in plural.

With the structure according to the third aspect of the invention, since the terminal apparatus exists in plural, the communication base station can receive the base station frequency error information from any of the terminal apparatuses, and thus the opportunity to receive the base station frequency error information increases. Therefore, the opportunity for the positioning terminal to obtain the base station frequency error information from the communication base station also increases.

A fourth aspect of the invention is a positioning system with a structure according to any of the first through the third aspect of the invention, wherein the communication base station has: base station frequency error information storage means for storing a plurality of pieces of the base station frequency error information; positioning satellite capturing purpose base station frequency error information generating means for generating positioning satellite capturing purpose base station frequency error information which is used for capturing satellite radio waves from positioning satellites by means of a positioning terminal by statistically processing a plurality of pieces of the base station frequency error information; and positioning satellite capturing purpose base station frequency error information transmitting means for transmitting the positioning satellite capturing purpose base station frequency error information in response to a request from the positioning terminal.

With the structure according to the fourth aspect of the invention, the communication base station can generate positioning satellite capturing purpose base station frequency error information which is used for capturing satellite radio waves from positioning satellites by means of a positioning terminal by statistically processing a plurality of pieces of the base station frequency error information using the positioning satellite capturing purpose base station frequency error information generating means. This allows, for example, reduction in variation in the base station frequency error information due to the elapsed time by averaging a plurality of pieces of the base station frequency error information sent from one of the terminal apparatuses, and reduction in variation in the base station frequency error information due to individual variability of each of the terminal apparatuses by averaging a plurality of pieces of the base station frequency error information sent from a plurality of the terminal apparatuses.

This allows provision of the positioning satellite capturing purpose base station frequency error information capable of further effectively preventing increase in the time to capture the satellite radio waves.

In order to achieve the above object, a terminal apparatus capable of communicating with a communication base station, according to a fifth aspect of the invention, includes: official frequency information storage means for storing official frequency information indicating an official frequency of a transmitting radio wave from the communication base station; base station synchronizing purpose frequency signal generating means for generating a base station synchronizing purpose frequency signal for receiving the transmitting radio wave; transmitting radio wave receiving means for receiving the transmitting radio wave; base station and terminal difference information generating means for generating base station and terminal difference information indicating a base station and terminal frequency difference, which is a frequency difference between a receiving frequency of the transmitting radio wave and a frequency of the base station synchronizing purpose frequency signal; base station and terminal error information generating means for generating base station and terminal error information indicating a rate of the base station and terminal frequency difference with respect to the official frequency; geostationary satellite frequency information storage means for storing geostationary satellite frequency information indicating a geostationary satellite frequency, which is a frequency of geostationary satellite radio wave transmitted from a geostationary satellite; geostationary satellite synchronizing purpose frequency signal generating means for generating a geostationary satellite synchronizing purpose frequency signal for receiving the geostationary satellite radio wave; geostationary satellite radio wave receiving means for receiving the geostationary satellite radio wave; geostationary satellite and terminal difference information generating means for generating geostationary satellite and terminal difference information indicating a geostationary satellite and terminal frequency difference, which is a frequency difference between a receiving frequency of the geostationary satellite radio wave and a frequency of the geostationary satellite synchronizing purpose frequency signal; geostationary satellite and terminal error information generating means for generating geostationary satellite and terminal error information indicating a rate of the geostationary satellite and terminal frequency difference with respect to the geostationary satellite frequency; base station frequency error information generating means for generating base station frequency error information indicating a frequency error of a transmitting radio wave from the communication base station based on the base station and terminal error information and the geostationary satellite and terminal error information; and base station frequency error information transmitting means for transmitting the base station frequency error information to the communication base station.

With the structure according to the fifth aspect of the invention, the terminal apparatus can generate the base station frequency error information using the base station frequency error information generating means.

The terminal apparatus can transmit the base station frequency error information to the communication base station using the base station frequency error information transmitting means.

Accordingly, a positioning terminal which positions a current position using satellite radio waves from positioning satellites becomes able to obtain the base station frequency error information. In other words, the terminal apparatus can generate and provide information for preventing increase in the time to capture satellite radio waves due to a transmitting radio wave of a base station with a frequency error.

In order to achieve the above object, a terminal apparatus capable of communicating with a communication base station, according to a sixth aspect of the invention, includes: geostationary satellite frequency information storage means for storing geostationary satellite frequency information indicating a geostationary satellite frequency, which is a frequency of a geostationary satellite radio wave transmitted from a geostationary satellite; geostationary satellite synchronizing purpose frequency signal generating means for generating a geostationary satellite synchronizing purpose frequency signal for receiving the geostationary satellite radio wave; geostationary satellite radio wave receiving means for receiving the geostationary satellite radio wave; geostationary satellite and terminal difference information generating means for generating geostationary satellite and terminal difference information indicating a geostationary satellite and terminal frequency difference, which is a frequency difference between a receiving frequency of the geostationary satellite radio wave and a frequency of the geostationary satellite synchronizing purpose frequency signal; geostationary satellite and terminal error information generating means for generating geostationary satellite and terminal error information indicating a rate of the geostationary satellite and terminal frequency difference with respect to the geostationary satellite frequency; frequency error correcting means for correcting a frequency error of a reference oscillator of the terminal apparatus based on the geostationary satellite and terminal error information; official frequency information storage means for storing official frequency information indicating an official frequency of a transmitting radio wave from the communication base station; base station synchronizing purpose frequency signal generating means for generating a base station synchronizing purpose frequency signal for receiving the transmitting radio wave; transmitting radio wave receiving means for receiving the transmitting radio wave; base station and terminal difference information generating means for generating base station and terminal difference information indicating a base station and terminal frequency difference, which is a frequency difference between a receiving frequency of the transmitting radio wave and a frequency of the base station synchronizing purpose frequency signal; base station and terminal error information generating means for generating base station and terminal error information indicating a rate of the base station and terminal frequency difference with respect to the official frequency; and base station error information transmitting means for transmitting the base station and terminal error information as base station frequency error information indicating a frequency error of a transmitting radio wave from the communication base station to the communication base station.

With the structure according to the sixth aspect of the invention, the terminal apparatus can generate the base station and terminal error information using the base station and terminal error information generating means. The terminal apparatus can transmit the base station and terminal error information to the communication base station as base station frequency error information which indicates a frequency error of a transmitting radio wave of the communication base station using the base station frequency error information transmitting means.

Accordingly, a positioning terminal which positions a current position using satellite radio waves from positioning satellites becomes able to obtain the base station frequency error information. In other words, the terminal apparatus can generate and provide information for preventing increase in the time to capture satellite radio waves due to a transmitting radio wave of a base station with a frequency error.

In order to achieve the above object, a control method of a terminal apparatus, according to a seventh aspect of the invention, includes the steps of: generating a base station synchronizing purpose frequency signal for receiving a transmitting radio wave by means of a terminal apparatus which is capable of communicating with a communication base station, and has official frequency information storage means for storing official frequency information indicating an official frequency of the transmitting radio wave from the communication base station, and geostationary satellite frequency information storage means for storing geostationary satellite frequency information indicating a geostationary satellite frequency, which is a frequency of a geostationary satellite radio wave from a geostationary satellite; receiving the transmitting radio wave by means of the terminal apparatus; generating base station and terminal difference information indicating a base station and terminal frequency difference, which is a frequency difference between a receiving frequency of the transmitting radio wave and a frequency of the base station synchronizing purpose frequency signal by means of the terminal apparatus; generating base station and terminal error information indicating a rate of the base station and terminal frequency difference with respect to the official frequency by means of the terminal apparatus; generating a geostationary satellite synchronizing purpose frequency signal for receiving the geostationary satellite radio wave by means of the terminal apparatus; receiving the geostationary satellite radio wave by means of the terminal apparatus; generating geostationary satellite and terminal difference information indicating a geostationary satellite and terminal frequency difference, which is a frequency difference between a receiving frequency of the geostationary satellite radio wave and a frequency of the geostationary satellite synchronizing purpose frequency signal by means of the terminal apparatus; generating geostationary satellite and terminal error information indicating a rate of the geostationary satellite and terminal frequency difference with respect to the geostationary satellite frequency by means of the terminal apparatus; generating base station frequency error information indicating a frequency error of a transmitting radio wave from the communication base station by means of the terminal apparatus based on the base station and terminal error information and the geostationary satellite and terminal error information; and transmitting the base station frequency error information to the communication base station by means of the terminal apparatus.

With the structure according to the seventh aspect of the invention, as with the structure according to the fifth aspect of the invention, it is possible to generate and provide information for preventing increase in the time to capture satellite radio waves due to a transmitting radio wave of a base station with a frequency error.

In order to achieve the above object, a control method of a terminal apparatus, according to an eighth aspect of the invention, includes the steps of: generating a geostationary satellite synchronizing purpose frequency signal for receiving a geostationary satellite radio wave by means of a terminal apparatus which is capable of communicating with a communication base station, and has official frequency information storage means for storing official frequency information indicating an official frequency of a transmitting radio wave from the communication base station, and geostationary satellite frequency information storage means for storing geostationary satellite frequency information indicating a geostationary satellite frequency, which is a frequency of the geostationary satellite radio wave from a geostationary satellite; receiving the geostationary satellite radio wave by means of the terminal apparatus; generating geostationary satellite and terminal difference information indicating a geostationary satellite and terminal frequency difference, which is a frequency difference between a receiving frequency of the geostationary satellite radio wave and a frequency of the geostationary satellite synchronizing purpose frequency signal by means of the terminal apparatus; generating geostationary satellite and terminal error information indicating a rate of the geostationary satellite and terminal frequency difference with respect to the geostationary satellite frequency by means of the terminal apparatus; correcting a frequency error of a reference oscillator of the terminal apparatus by means of the terminal apparatus based on the geostationary satellite and terminal error information; generating a base station synchronizing purpose frequency signal for receiving the transmitting radio wave by means of the terminal apparatus; receiving the transmitting radio wave by means of the terminal apparatus; generating base station and terminal difference information indicating a base station and terminal frequency difference, which is a frequency difference between a receiving frequency of the transmitting radio wave and a frequency of the base station synchronizing purpose frequency signal by means of the terminal apparatus; generating base station and terminal error information indicating a rate of the base station and terminal frequency difference with respect to the official frequency by means of the terminal apparatus; and transmitting the base station and terminal error information as base station frequency error information indicating a frequency error of a transmitting radio wave from the communication base station to the communication base station by means of the terminal apparatus.

With the structure according to the eighth aspect of the invention, as with the structure according to the sixth aspect of the invention, it is possible to generate and provide information for preventing increase in the time to capture satellite radio waves due to a transmitting radio wave of a base station with a frequency error.

BRIEF DESCRIPTION OF THE DRAWINGS

The invention will be described with reference to the accompanying drawings, wherein like numbers reference like elements.

FIG. 1 schematically shows a positioning system in an embodiment according to the invention.

FIG. 2 schematically shows a main hardware structure of a terminal.

FIG. 3 schematically shows a main hardware structure of a base station.

FIG. 7 describes a base station radio wave synchronizing purpose frequency signal generating program and the like.

FIG. 8 schematically shows a correlation peak value and the like.

FIG. 9 describes a first difference information generating program and the like.

FIG. 10 describes geostationary satellite radio wave synchronizing purpose frequency signal generating program.

FIG. 11 schematically shows a main software structure of the base station.

FIG. 12 schematically shows a main software structure of the management server.

FIG. 13 shows an example of a base station error information database.

FIG. 14 describes a supply purpose base station error information generating program.

FIG. 16 describes a base station radio wave synchronizing purpose frequency signal generating program and the like.

FIG. 21 describes a terminal side reference oscillator error correcting program.

FIG. 22 schematically shows a flowchart of an operation example of the positioning system.

DESCRIPTION OF EXEMPLARY EMBODIMENTS

Figure 4:
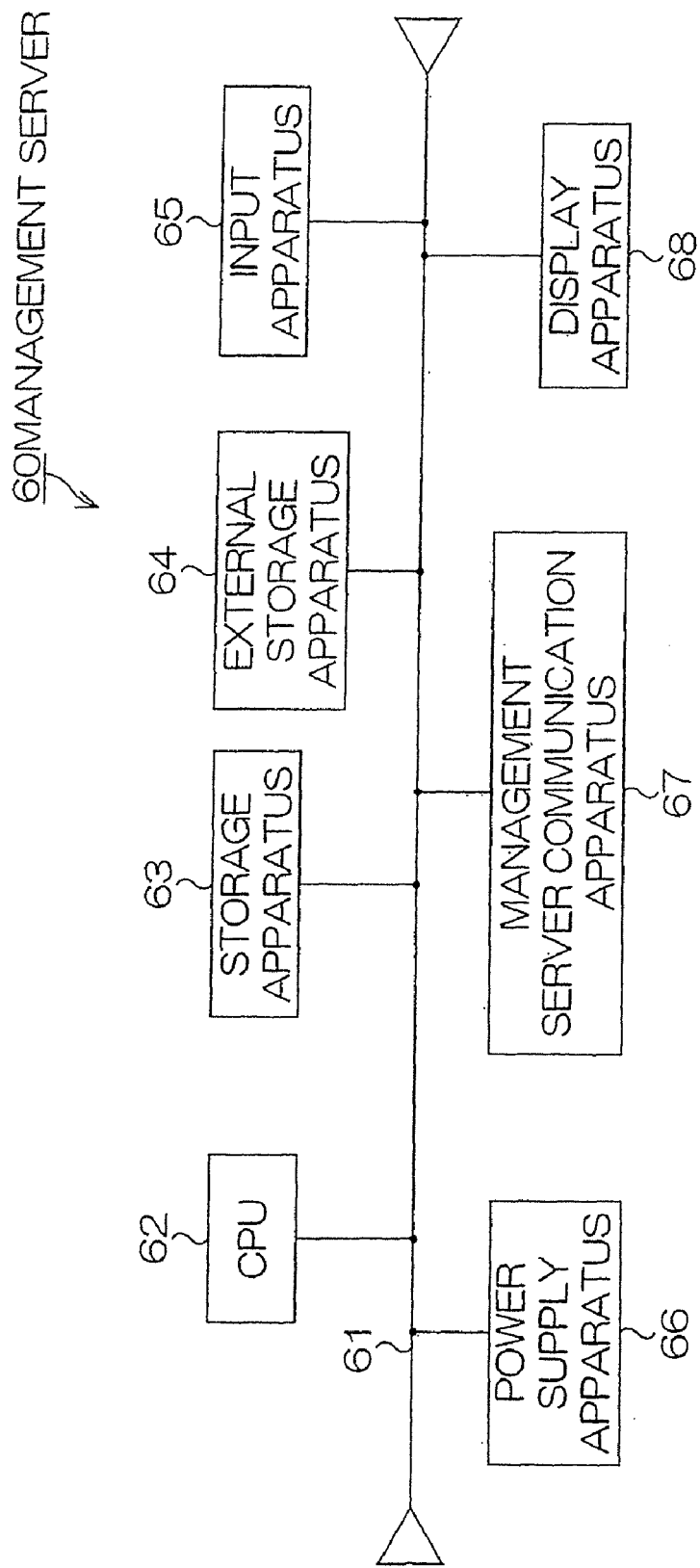
FIG. 4 schematically shows a main hardware structure of a management server.

Hereinafter, with reference to the drawings, the preferred exemplary embodiments of the invention will be described in detail.

The following embodiments are given various limitations that are preferable technically because they are the exemplary specific examples of the invention, however, the scope of the invention is not limited to these aspects unless there is a particular description to limit the invention in the following description.

FIG. 1 schematically illustrates a positioning system 10 and the like according to a first embodiment of the invention.

As illustrated in FIG. 1, the positioning system 10 includes base stations 40A and 40B. The base stations 40A and 40B are, for example, communication base stations in a cellular phone network.

The positioning system 10 also includes a base station error information management server (hereinafter, referred to as management server) 60. The management server 60 can communicate with the base stations 40A and the like via a lease line 55. The management server 60 controls the base stations 40A and the like, and manages frequency error information of the base stations 40A and the like to be described later. The base station 40A and the management server 60 is an example of communication base stations. Similarly, the base station 40B and the management server 60 is an example of communication base stations.

In addition, as illustrated in FIG. 1, the positioning system 10 includes multiple base station error calculating terminals (hereinafter, referred to as terminals) 20A, 20B, 20C, and 20D. The terminals 20A and the like can communicate with the base stations 40A and the like by receiving a communication radio waves C1 (hereinafter, referred to as radio waves C1) from the base stations 40A and the like. The terminals 20A and the like are examples of terminal apparatus. The radio waves C1 is an example of transmitting radio waves.

A digital mobile communication system employing CDMA (Code Division Multiple Access) system is configured with the base stations 40A and the like, the management server 60, and the terminals 20A and the like.

The terminals 20A and the like can receive geostationary satellite radio waves S (hereinafter, referred to as radio waves S) from a geostationary satellite 14. The radio waves S are an example of geostationary satellite radio waves.

As illustrated in FIG. 1, the positioning system 10 also includes a positioning terminal 80. The positioning terminal 80 receives satellite radio waves G1, G2, G3, and G4 (hereinafter, referred to as radio waves G1 and the like) from GPS satellites 12a, 12b, 12c, and 12d, thereby positioning a current position. The above-mentioned GPS satellites 12a and the like is are examples of positioning satellites, and the radio waves G1 and the like are examples of satellite radio waves.

The terminal 20A and the like may be, for example, a cellular phone, a PHS (Personal Handy-phone System), PDA (Personal Digital Assistance) or the like, but not limited to these. In addition, the number of the terminals 20A and the like is not limited to four, may be one through three, or may be five or more.

In addition, the respective numbers of the base stations 40A and the like, the management server 60, and the positioning terminal 80 are not limited to this embodiment.

The invention is not limited to this embodiment, the number of GPS satellites 12a and the like may be three or five or more.

In addition, the number of the geostationary satellite 14 may be two or more.

Main Hardware Structure of Terminal 20A

FIG. 2 schematically illustrates a main hardware structure of the terminal 20A.

It should be noted that main hardware structures of the terminals 20B through 20D are the same as that of the terminal 20A, and thus description thereof is omitted.

As illustrated in FIG. 2, the terminal 20A includes a computer, which is equipped with a bus 21.

A CPU (Central Processing Unit) 22 and a storage apparatus 23 are connected with the bus 21. The storage apparatus 23 may be a RAM (Random Access Memory), a ROM (Read Only Memory), or the like.

In addition, an input apparatus 24 for inputting each piece of information, a power supply apparatus 25 such as a battery or the like, a communication apparatus 26 for communicating with the base stations 40A and the like, a GPS apparatus 27 for receiving the radio waves G1 and the like (see FIG. 1) from the GPS satellites 12a and the like, a display apparatus 28 for displaying each piece of information, and a terminal reference oscillator 29 for generating a reference frequency signal (also referred to as reference clock) of the terminal 20A are connected with the bus 21. The terminal reference oscillator 29 may be, for example, a TCXO (Temperature Compensated Xtal Oscillator).

Moreover, an NCO (Numerically Controlled Oscillator) 30 for generating a signal with a required frequency for the terminal 20A based on a signal oscillated by the terminal reference oscillator 29 is connected with the bus 21. Frequency deviation between frequency of a signal oscillated by the terminal reference oscillator 29 and the reference frequency causes frequency deviation between a signal generated by the NCO 30 and a target frequency. As described later, the terminal 20A can correct frequency deviation of a signal oscillated by the terminal reference oscillator 29 by detecting the frequency deviation of the signal oscillated by the terminal reference oscillator 29, and changing a parameter of the NCO 30.

Main Hardware Structure of Base Station 40A

FIG. 3 schematically illustrates a main hardware structure of the base station 40A.

It should be noted that a main hardware structure of the base station 40B is the same as that of the base station 40A, and thus description thereof is omitted.

As illustrated in FIG. 3, the base station 40A includes a computer, which is equipped with a bus 41.

A CPU (Central Processing Unit) 42, a storage apparatus 43, an external storage apparatus 44, and the like are connected with the bus 41. The external storage apparatus 44 may be a HDD (Hard Disk Drive) or the like.

In addition, an input apparatus 45, a power supply apparatus 46, a base station communication apparatus 47 for communicating with the terminals 20A and the like and the management server 60, a display apparatus 48, a base station reference oscillator 49, and an NCO 50 are connected with the bus 41.

Main Hardware Structure of Management Server 60

FIG. 4 schematically illustrates a main hardware structure of the management server 60.

As illustrated in FIG. 4, the management server 60 includes a computer, which is equipped with a bus 61.

A CPU 62, a storage apparatus 63, an external storage apparatus 64, an input apparatus 65, a power supply apparatus 66, a management server communication apparatus 67 for communicating with and the base stations 40A and the like, and a display apparatus 68 are connected with the bus 61.

Main Hardware Structure of Positioning Terminal 80

Figure 5:
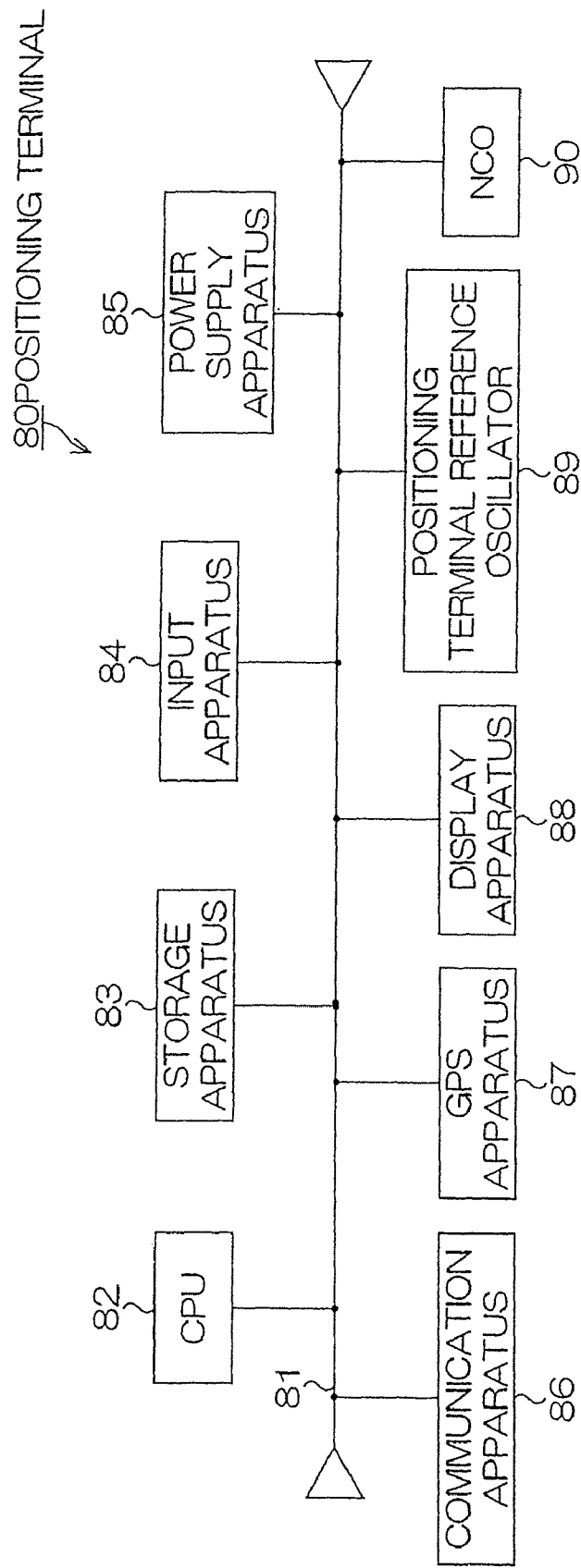
FIG. 5 schematically shows a main hardware structure of a positioning terminal.

FIG. 5 schematically illustrates a main hardware structure of the positioning terminal 80.

As illustrated in FIG. 5, the positioning terminal 80 includes a computer, which is equipped with a bus 81.

A CPU 82, a storage apparatus 83, an input apparatus 84, a power supply apparatus 85, a communication apparatus 86 for communicating with the base stations 40A and the like, a GPS apparatus 87 for receiving the radio waves G1 and the like from the GPS satellites 12a and the like, a display apparatus 88, a positioning terminal reference oscillator 89, and an NCO 90 are connected with the bus 81.

Main Software Structure of Terminal 20A

Figure 6:
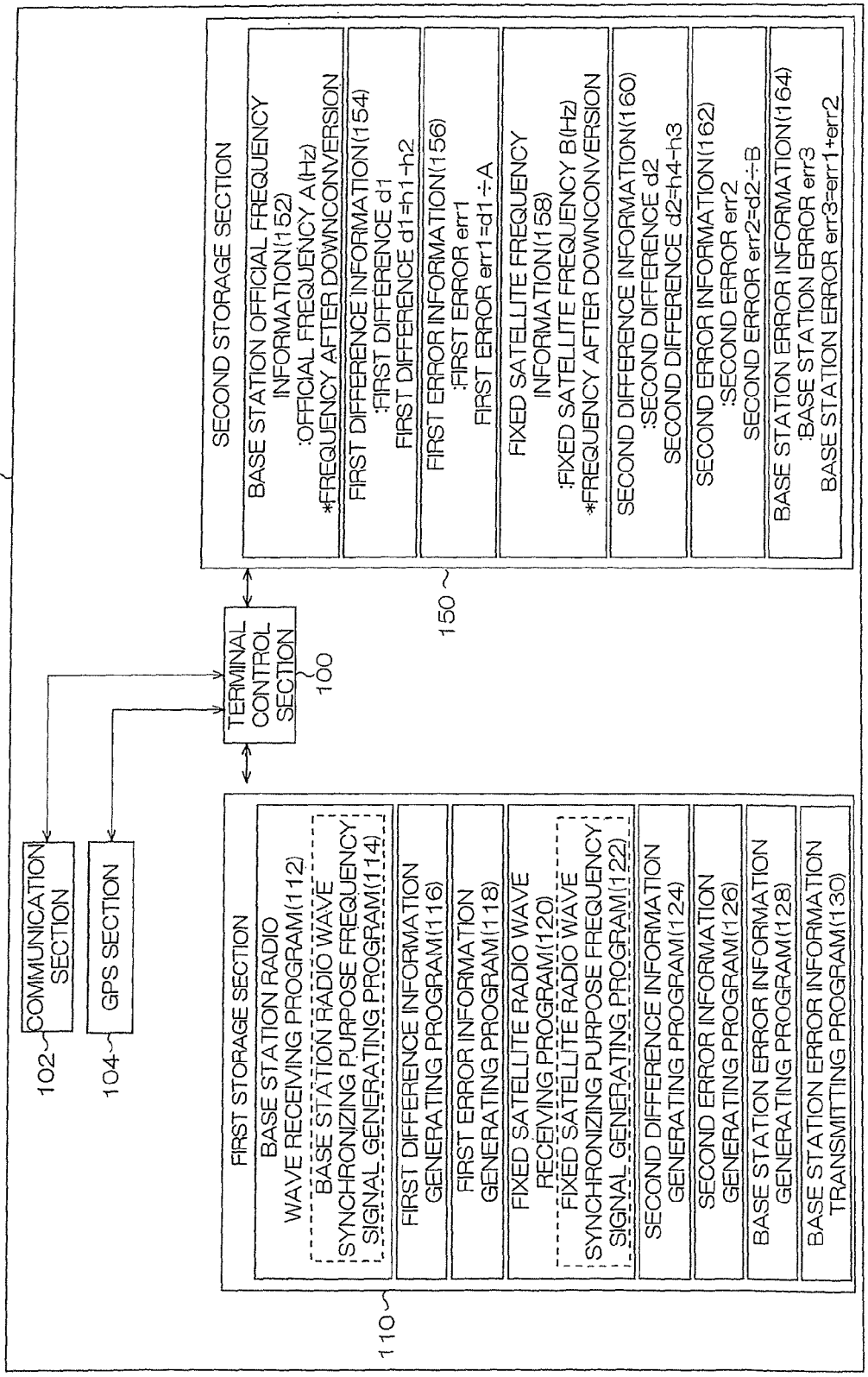
FIG. 6 schematically shows a main software structure of the terminal.

FIG. 6 schematically illustrates a main software structure of the terminal 20A.

It should be noted that main software structures of the terminals 20B through 20D are the same as that of the terminal 20A, and thus description thereof is omitted.

As illustrated in FIG. 6, the terminal 20A includes a terminal control section 100 for controlling each section, a communicating section 102 corresponding to the communication apparatus 26 in FIG. 2, a GPS section 104 corresponding to the GPS apparatus 27, and the like.

The terminal 20A also includes a first storage section 110 for storing each program and a second storage section 150 for storing each piece of information.

As illustrated in FIG. 6, the terminal 20A stores base station official frequency information 152 in the second storage section 150. The base station official frequency information 152 is information indicating official frequency A (Hz) of the radio waves C1 (see FIG. 1) of the base stations 40A and 40B. The base station official frequency information 152 is an example of official frequency information. The second storage section 150 is an example of official frequency information storage means. It should be noted that the official frequency A is not a frequency when it is transmitted from the base stations 40A and the like, but a frequency which is received by an antenna (not shown in the drawing) of the terminals 20A and the like, and then down-converted to a synchronizing purpose frequency within the terminals 20A and the like.

As illustrated in FIG. 6, the terminal 20A stores a base station radio waves receiving program 112 in the first storage section 110. The base station radio waves receiving program 112 includes a base station radio wave synchronizing purpose frequency signal generating program 114. The base station radio wave synchronizing purpose frequency signal generating program 114 is a program that the terminal control section 100 generates a signal with frequency h2 (see FIG. 7) for receiving the transmitting radio waves C1 and the like. The signal with frequency h2 is an example of base station synchronizing purpose frequency signal. The base station radio wave synchronizing purpose frequency signal generating program 114 and the terminal control section 100 is an example of base station synchronizing purpose frequency signal generating means.

FIG. 7 is a diagram for describing the base station radio wave synchronizing purpose frequency signal generating program 114 and the like.

As illustrated in FIG. 7(a), the terminal control section 100 generates a signal with base station synchronizing purpose frequency h2 (hereinafter, referred to as frequency h2) using formula 1 to multiply a frequency h0 of a signal oscillated by the terminal reference oscillator 29 (see FIG. 2) by a constant α1. More specifically, the terminal control section 100 sets the constant α1 to the NCO 30.

In this case, the frequency h0 of a signal oscillated by the terminal reference oscillator 29 (see FIG. 2) has an error with respect to the reference frequency thereof, the frequency h2 thus has an error b1 with respect to the official frequency A (Hz).

The base station radio waves receiving program 112 is described forthwith.

As illustrated in FIG. 7(b), the terminal control section 100 correlates a PRN (Pseudo Random Noise) code put on the radio waves C1 sent from the base station 40A with a replica PRN code stored in the terminal 20A to synchronize with the radio waves C1, thereby receiving the radio waves C1. In other words, the base station radio waves receiving program 112 and the control section 100 is an example of the transmitting radio wave receiving means.

In this case, as illustrated by an arrow T1 in FIG. 7(b), the maximum correlation value (correlation peak value) is obtained while moving the phase of the replica PRN code along a chip direction.

In addition, as illustrated in FIG. 7(c), the correlation peak value is obtained while changing a chip length L of the PRN code stored in the terminal by changing the synchronizing purpose frequency based on the frequency h2.

FIG. 8 schematically illustrates a correlation peak value and the like.

As illustrated in FIG. 8(a), when there is no frequency error in both the radio waves C1 transmitted from the base station 40A and the terminal frequency oscillator 29 of the terminal 20A, the correlation peak value can be obtained at the frequency h2 generated by the terminal 20A.

But the fact is that there is frequency error in the radio waves C1 transmitted from the base station 40A or in the terminal reference oscillator 29 of the terminal 20A, the correlation peak value is obtained at a frequency deviated from the frequency h2, as illustrated in FIG. 8(b).

As illustrated in FIG. 6, the terminal 20A stores a first difference information generating program 116 in the first storage section 110. The first difference information generating program 116 is a program that the terminal control section 100 generates first difference information 154 indicating a first difference d1, which is frequency difference between the receiving frequency h1 (see FIG. 1) of the transmitting radio waves C1 and the frequency h2. The first difference information 154 is an example of base station and terminal difference information. The first difference information generating program 116 and the terminal control section 100 is an example of base station and terminal difference information generating means.

FIG. 9 is a diagram for describing the first difference information generating program 116 and the like.

As illustrated in FIG. 9(a), the terminal control section 100 calculates the first difference d1 (see FIG. 8(b)) using formula 2 to subtract the aforementioned frequency h2 from the receiving frequency h1 at which the correlation peak value is actually obtained.

The terminal control section 100 stores the generated first difference information 154 in the second storage section 150.

As illustrated in FIG. 6, the terminal 20A stores a first error information generating program 118 in the first storage section 110. The first error information generating program 118 is a program that the terminal control section 100 generates first error information 156 indicating a first error err1, which is a rate of the first difference d1 with respect to the official frequency A based on the first difference information 154. The first error information 156 is an example of base station and terminal error information. The first error information generating program 118 and the terminal control section 100 is an example of base station and terminal error information generating means.

As illustrated in FIG. 9(b), the terminal control section 100 calculates the first error err1 using formula 3 to divide the first difference d1 by the official frequency A.

Here, as illustrated in FIG. 9(a), the first difference d1 includes frequency error a of the base station 40A and frequency error of the terminal 20A, the err1 thus includes a/A which is a rate of the frequency error a of the base station 40A with respect to the official frequency A and b1/A which is a rate of the frequency error b1 of the terminal 20A with respect to the official frequency A.

The terminal control section 100 stores the generated first error information 156 in the second storage section 150.

As illustrated in FIG. 6, the terminal 20A stores geostationary satellite frequency information 158 in the second storage section 150. The geostationary satellite frequency information 158 is information indicating official frequency B (Hz) of the radio waves S (see FIG. 1) of the geostationary satellite 14. The geostationary satellite frequency information 158 is an example of geostationary satellite frequency information. The second storage section 150 is an example of geostationary satellite frequency information storage means. It should be noted that the geostationary satellite frequency B is not a frequency at which the geostationary satellite 14 transmits the radio waves S, but a frequency after the radio waves is received by an antenna (not shown in the drawing) of the terminal 20A and down-converted to a synchronizing purpose frequency within the terminal 20A.

As illustrated in FIG. 6, the terminal 20A stores geostationary satellite radio waves receiving program 120 in the first storage section 110. The geostationary satellite radio waves receiving program 120 includes geostationary satellite radio wave synchronizing purpose frequency signal generating program 122. The geostationary satellite radio wave synchronizing purpose frequency signal generating program 122 is a program that the terminal control section 100 generates a signal with frequency h4 (see FIG. 7) for receiving the radio waves S. The signal with frequency h4 is an example of geostationary satellite synchronizing purpose frequency signal. The geostationary satellite radio wave synchronizing purpose frequency signal generating program 122 and the terminal control section 100 is an example of geostationary satellite synchronizing purpose frequency signal generating means.

FIG. 10 is a diagram for describing the geostationary satellite radio wave synchronizing purpose frequency signal generating program 122 and the like.

As illustrated in FIG. 10(a), the terminal control section 100 generates a signal with geostationary satellite radio wave synchronizing purpose frequency h4 (hereinafter, referred to as frequency h4) using formula 4 to multiply the frequency h0 of a signal oscillated by the terminal reference oscillator 29 (see FIG. 2) by a constant α2. More specifically, the terminal control section 100 sets the constant α2 to the NCO 30.

As described above, the frequency h0 of a signal oscillated by the terminal reference oscillator 29 (see FIG. 2) has an error with respect to the reference frequency thereof, the frequency h4 thus has an error b2 with respect to the geostationary satellite frequency B (Hz).

The terminal control section 100 receives the radio waves S using a signal with frequency h4 based on the geostationary satellite radio waves receiving program 120. More specifically, the terminal control section 100 correlates a PRN code put on the radio waves S sent from the geostationary satellite 14 with a replica PRN code stored in the terminal 20A to synchronize with the radio waves S, thereby receiving the radio waves S. In other words, the geostationary satellite radio waves receiving program 120 and the control section 100 is an example of geostationary satellite radio wave receiving means.

As illustrated in FIG. 6, the terminal 20A stores a second difference information generating program 124 in the first storage section 110. The second difference information generating program 124 is a program that the terminal control section 100 generates second difference information 160 indicating a second difference d2, which is frequency difference between receiving frequency h3 (see FIG. 1) of the geostationary satellite radio waves S and the frequency h4.

The second difference information 160 is an example of geostationary satellite and terminal difference information. The second difference information generating program 124 and the terminal control section 100 is an example of geostationary satellite and terminal difference information generating means.

As illustrated in FIG. 10(b), the terminal control section 100 calculates the second difference d2 using formula 5 to subtract the receiving frequency h3 at which the correlation peak value is actually obtained from the aforementioned frequency h4.

The terminal control section 100 stores the generated second difference information 160 in the second storage section 150.

As illustrated in FIG. 6, the terminal 20A stores a second error information generating program 126 in the first storage section 110. The second error information generating program 126 is a program that the terminal control section 100 generates second error information 162 indicating a second error err2, which is a rate of the second difference d2 with respect to the geostationary satellite frequency B based on the second difference information 160. The second error information 162 is an example of geostationary satellite and terminal error information. The second error information generating program 126 and the terminal control section 100 is an example of geostationary satellite and terminal error information generating means.

As illustrated in FIG. 10(c), the terminal control section 100 calculates the second error err2 using formula 6 to divide the second difference d2 by the geostationary satellite frequency B.

Here, as illustrated in formula 5 in FIG. 10(b), the second difference d2 is configured with only frequency deviation b2 of the terminal 20A, and thus the second error err2 is configured with only a rate b2/B of the frequency error b1 of the terminal 20A with respect to the geostationary satellite frequency B.

The terminal control section 100 stores the generated second error information 162 in the second storage section 150.

As illustrated in FIG. 6, the terminal 20A stores a base station error information generating program 128 in the first storage section 110. The base station error information generating program 128 is a program that the terminal control section 100 generates base station error information 164 indicating a base station error err3, which is frequency error of the transmitting radio waves C1 of the base station 40A, based on the first error information 156 and the second error information 162. The base station error information 164 is an example of base station frequency error information. The base station error information generating program 128 and the terminal control section 100 is an example of base station frequency error information generating means.

More specifically, as illustrated in FIG. 10(d), the terminal control section 100 calculates the base station error err3 using formula 7 to add the first error err1 indicated in the first error information 156 and the second error err2 indicated in the second error information 162.

The base station error err3 is a rate a/A of the base station error a (see FIG. 1) with respect to the official frequency A. Here, a formula of a/A=err1+b1/A can be derived from formula 3 (FIG. 9(b)). In addition, both b1/A and b2/B are frequency error rates of the terminal 20A with respect to the reference frequencies (official frequency A and geostationary satellite frequency B). This means that both b1/A and b2/B indicate error rates with respect to the reference frequency of the terminal reference oscillator 29, and thus b1/A is equal to b2/B. Therefore, b2/B (=err2) can be substituted for b1/A into the aforementioned formula of a/A=err1+b1/A, and thus a formula of err3=err1+err2 is provided.

The terminal control section 100 stores the generated based station error information 164 in the second storage section 150.

As illustrated in FIG. 6, the terminal 20A stores a base station error information transmitting program 130 in the first storage section 110. The base station error information transmitting program 130 is a program that the terminal control section 100 transmits base station error information 164 to the base station 40A. In other words, the base station error information transmitting program 130 and the terminal control section 100 is an example of base station frequency error information transmitting means.

Main Software Structure of Base Station 40A

FIG. 11 schematically illustrates a main software structure of the base station 40A.

It should be noted that a main software structure of the base station 40B is the same as that of the base station 40A, and thus description thereof is omitted.

As illustrated in FIG. 11, the base station 40A has a base station control section 200 for controlling each section, a communicating section 202 corresponding to the base station communication apparatus 47 in FIG. 3, and the like.

As illustrated in FIG. 11, the base station 40A also has a first storage section 210 for storing each program and a second storage section 250 for storing each piece of information.

As illustrated in FIG. 11, base station official transmitting frequency information 252 which indicates a base station official transmitting frequency hbs is stored in the second storage section 250.

The base station official transmitting frequency hbs is official frequency Abs at which the base station 40A transmits the radio waves C1.

The aforementioned terminal 20A receives the base station official transmitting frequency information 252, thereby generating the base station frequency information 152 (see FIG. 6) indicating frequency of the radio waves C1, which is down-converted for synchronization within the terminal 20A.

As illustrated in FIG. 11, the base station 40A stores a base station error information receiving program 212 in the first storage section 210. The base station error information receiving program 212 is a program that the base station control section 200 receives the base station error information 164 (see FIG. 6) from the terminals 20A and the like using the communicating section 202, and stores it in the second storage section 250 as base station side base station error information 254.

As illustrated in FIG. 11, the base station 40A stores a base station error information transferring program 214 in the first storage section 210. The base station error information transferring program 214 is a program that the base station control section 200 transmits the base station side base station error information 254 to the management sever 60.

As illustrated in FIG. 11, the base station 40A stores a supply purpose base station error information transferring program 216 in the first storage section 210. The supply purpose base station error information transferring program 216 is a program that the base station control section 200 receives supply purpose base station error information 354 to be described later from the management server 60, stores it in the second storage section 250 as base station side supply purpose base station error information 256, and transmits the base station side supply purpose base station error information 256 to the positioning terminal 80 in response to a request therefrom. The supply purpose base station error information 354 (base station side supply purpose base station error information 256) is also an example of base station frequency error information. In addition, the supply purpose base station error information transferring program 216 and the base station control section 200 is an example of base station frequency error information transmitting means.

Main Software Structure of Management Server 60

FIG. 12 schematically illustrates a main software structure of the management server 60.

As illustrated in FIG. 12, the management server 60 has a server control section 300 for controlling each section, a communicating section 302 corresponding to the management server communication apparatus 67 in FIG. 4, and the like.

The management server 60 also has a first storage section 310 for storing each program and a second storage section 350 for storing each piece of information.

As illustrated in FIG. 12, the management server 60 stores a server side base station error information receiving program 312 in the first storage section 310. The server side base station error information receiving program 312 is a program that the server control section 300 receives and stores the base station side base station error information 254 (see FIG. 11) from the base stations 40A and the like in a base station error information database 352.

FIG. 13 schematically illustrates an example of the base station error information database 352.

As illustrated in FIG. 13, the base station error information database 352 corresponds information indicating multiple base station errors err3A1 through err3An regarding the base station 40A with times at which each piece of information is received, and then stores it. Similarly, the base station error information database 352 corresponds information indicating multiple base station errors err3B1 through err3Bn regarding the base station 40B with times at which each piece of information is received, and then stores it. As described above, the base station error information database 352 corresponds information indicating multiple base station errors err3 for each of base stations 40A and the like with times at which each piece of information is received, and then stores it. The base station errors err3 sent from the base station 40A are named as base station errors err3A1 and the like, and the base station errors err3 sent from the base station 40B as base station errors err3B1 and the like so as to distinguish with each other. The base station error information database 352 is an example of base station frequency error information storage means.

As illustrated in FIG. 12, the management server 60 stores a supply purpose base station error information generating program 314 in the first storage section 310. The supply purpose base station error information generating program 314 is a program that the server control section 300 generates supply purpose base station error information 354 which is used to capture the radio waves G1 and the like from the GPS satellites 12a and the like by the positioning terminal 80 by statistically processing the multiple base station errors err3A1 and the like. The supply purpose base station error information 354 is an example of positioning satellite capturing purpose base station frequency error information. The supply purpose base station error information generating program 314 and the server control section 300 is an example of positioning satellite capturing purpose base station frequency error information generating means.

FIG. 14 is a diagram for describing the supply purpose base station error information generating program 314.

When a request is received from the positioning terminal 80 via the base station 40A, for example, the server control section 300 calculates an average value err3av, which is referred to as supply purpose base station error err3av, of the base station errors err3A1 through err3An of the base station 40A using formula 8 in FIG. 14.

The server control section 300 stores the supply purpose base station error information 354 which indicates the supply purpose base station error err3av in the second storage section 350.

The invention is not limited to this embodiment, the server control section 300 may not use all base station errors err3A1 and the like within the base station error information database 352, but may use the base station errors err3A1 and the like stored within a predetermined time period such as 24 hours.

As illustrated in FIG. 12, the management server 60 stores a supply purpose base station error information transmitting program 316 in the first storage section 310. The supply purpose base station error information transmitting program 316 is a program that the server control section 300 transmits the supply purpose base station error information 354 to the positioning terminal 80 via the base station 40A which is being communicated with the positioning terminal 80 in response to a request from the positioning terminal 80. In other words, the supply purpose base station error information transmitting program 316 and the server control section 300 is an example of positioning satellite capturing purpose base station frequency error information transmitting means.

Main Software Structure of Positioning Terminal 80

Figure 15:
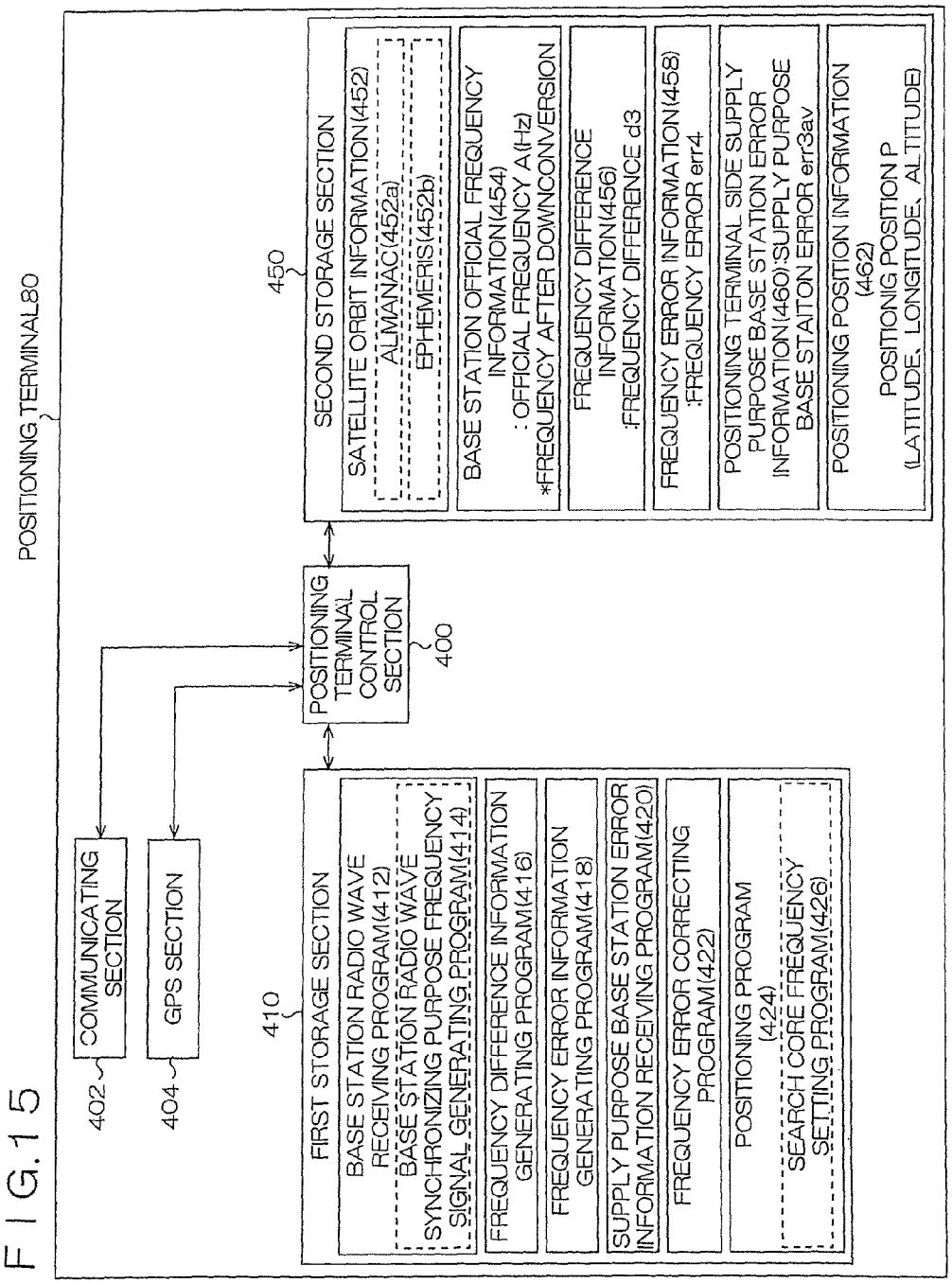
FIG. 15 schematically shows a main software structure of the positioning terminal.

FIG. 15 schematically illustrates a main software structure of the positioning terminal 80.

As illustrated in FIG. 15, the positioning terminal 80 has a positioning terminal control section 400 for controlling each section, a communicating section 402 corresponding to the communication apparatus 86 in FIG. 5, a GPS section 404 corresponding to the GPS apparatus 87, and the like.

The terminal 80 also has a first storage section 410 for storing each program and a second storage section 450 for storing each piece of information.

As illustrated in FIG. 15, the positioning terminal 80 stores satellite orbit information 452 in the second storage section 450. The satellite orbit information 452 includes almanac 452a which is rough orbit information of all GPS satellites 12a and the like and ephemeris 452b which is accurate orbit information of each of GPS satellites 12a and the like. The satellite orbit information 452 is used for receiving the radio waves G1 and the like from the GPS satellites 12a and the like and positioning.

The positioning terminal control section 400 periodically receives the radio waves G1 and the like from the GPS satellites 12a and the like using the GPS section 404 serving as a relay station, and extracts the almanac and ephemeris from the radio waves G1 and the like. The almanac is updated every seven days, and the ephemeris is updated every four hours to keep them effective.

As illustrated in FIG. 15, the positioning terminal 80 stores base station official frequency information 454 in the second storage section 450. The base station official frequency information 454 is the same as the base station official frequency information 152 (see FIG. 6) of the terminals 20A and the like. The second storage section 450 is an example of positioning side official frequency information storage means.

As illustrated in FIG. 15, the positioning terminal 80 stores a base station radio waves receiving program 412 in the first storage section 410. The base station radio waves receiving program 412 includes a base station radio wave synchronizing purpose frequency signal generating program 414. The base station radio wave synchronizing purpose frequency signal generating program 414 is a program that the positioning terminal control section 400 generates a signal with frequency h6 (see FIG. 16) for receiving the transmitting radio waves C1 and the like. The signal with frequency h6 is an example of base station synchronizing purpose frequency signal. The base station radio wave synchronizing purpose frequency signal generating program 414 and the positioning terminal control section 400 is an example of positioning side base station synchronizing purpose frequency signal generating means.

FIG. 16 is a diagram for describing the base station radio wave synchronizing purpose frequency signal generating program 414 and the like.

As illustrated in FIG. 16(a), the positioning terminal control section 400 generates a signal with base station frequency synchronizing purpose frequency h5 (hereinafter, referred to as frequency h5) using formula 9 to multiply the frequency h0 of a signal oscillated by the positioning terminal reference oscillator 89 (see FIG. 5) by a constant α2. More specifically, the positioning terminal control section 400 sets the constant α2 to the NCO 90.

Here, the frequency h0 of a signal oscillated by the positioning terminal reference oscillator 89 has an error with respect to the reference frequency thereof, the frequency h5 thus has an error b3 with respect to the official frequency A (Hz).

The positioning terminal control section 400 uses a signal with frequency h5 to synchronize with the transmitting radio waves C2 from the base station 40B, and receives the transmitting radio waves C2 based on the base station radio waves receiving program 412. The base station radio waves receiving program 412 and the positioning terminal control section 400 is an example of positioning side transmitting radio wave receiving means. The contents of the base station radio waves receiving program 412 are similar to those of the base station radio waves receiving program 112 of the terminal 20A described above, and thus detailed description thereof is omitted.

As illustrated in FIG. 15, the positioning terminal 80 stores frequency difference information generating program 416 in the first storage section 410. The frequency difference information generating program 416 is a program that the positioning terminal control section 400 generates frequency difference information 456 which indicates frequency difference d3 between receiving frequency h1 of the transmitting radio waves C1 from the base station 40A and the aforementioned frequency h5. The frequency difference information 456 is an example of base station and positioning terminal difference information. The frequency difference information generating program 416 and the positioning terminal control section 400 is an example of base station and positioning terminal difference information generating means.

As illustrated in FIG. 16(b), the positioning terminal control section 400 calculates the frequency difference d3 using formula 10 to subtract the aforementioned frequency h5 from the receiving frequency h1 at which the correlation peak value is actually obtained.

The positioning terminal control section 400 stores the generated frequency difference information 456 in the second storage section 450.

As illustrated in FIG. 15, the positioning terminal 80 stores frequency error information generating program 418 in the first storage section 410. The frequency error information generating program 418 is a program that the positioning terminal control section 400 generates frequency error information 458 indicating frequency error err4, which is a rate of the frequency difference d3 with respect to the official frequency A, based on the frequency difference information 456.

The frequency error information 458 is an example of base station and positioning terminal error information. The frequency error information generating program 418 and the positioning terminal control section 400 is an example of base station and positioning terminal error information generating means.

As illustrated in FIG. 16(c), the positioning terminal control section 400 calculates the frequency error err4 using formula 11 to divide the frequency difference d3 by the official frequency A.

Here, as illustrated in FIG. 16(c), the frequency error d3 includes the frequency error a of the base station 40A and frequency error b3 of the positioning terminal 80, the base station error err3 thus includes a/A which is a rate of the frequency error a of the base station 40A with respect to the official frequency A and b3/A which is a rate of the frequency error b3 of the positioning terminal 80 with respect to the official frequency A.

The positioning terminal control section 400 stores the generated frequency error information 458 in the second storage section 450.

As illustrated in FIG. 15, the positioning terminal 80 stores a supply purpose base station error information receiving program 420 in the first storage section 410. The supply purpose base station error information receiving program 420 is a program that the positioning terminal control section 400 receives base station side supply purpose base station error information 256 (see FIG. 11) from the base station 40A which is being communicated. In other words, the supply purpose base station error information receiving program 420 and the positioning terminal control section 400 is an example of base station frequency error information receiving means.

The positioning terminal control section 400 receives the base station side supply purpose base station error information 256 (see FIG. 11) using the communicating section 402 and stores it in the second storage section 450 as positioning terminal side supply purpose base station error information 460.

As illustrated in FIG. 15, the positioning terminal 80 stores frequency error correcting program 422 in the first storage section 410. The frequency error correcting program 422 is a program that the positioning terminal control section 400 corrects frequency error of the positioning terminal reference oscillator 89 (see FIG. 5) based on the positioning terminal side supply purpose base station error information 460 and the frequency error information 458. In other words, the frequency error correcting program 422 and the positioning terminal control section 400 is an example of positioning side frequency error correcting means.

As illustrated in FIG. 16(d), the positioning terminal control section 400 corrects the frequency error of the positioning terminal reference oscillator 89 using formula 12 to multiply (1—err4—err3av) as a parameter of the NCO 90. Here, as shown in formula 11, the frequency error err4 includes the frequency error a/A of the base station 40A. The supply purpose base station error err3av can be used as the frequency error a/A of the base station 40A. This allows correction of the frequency deviation of the positioning terminal reference oscillator 89 from the reference frequency using the frequency error err4 and the supply purpose base station error err3av.

As illustrated in FIG. 15, the positioning terminal 80 stores a positioning program 424 in the first storage section 410. The positioning program 424 is a program that the positioning terminal control section 400 receives the radio waves G1 and the like from the GPS satellites 12a and the like, positions a current position, and generates positioning position information 462 which indicates a positioning position P. In other words, the positioning program 424 and the positioning terminal control section 400 is an example of satellite radio wave receiving means.

The positioning program 424 includes a search core frequency setting program 426. The search core frequency setting program 426 is a program that the positioning terminal control section 400 sets a search core frequency h7 (see FIG. 16(e)) to capture the radio waves G1 and the like in consideration of Doppler shift due to relative movement between the positioning terminal 80 and the GPS satellites 12a and the like.

The positioning terminal control section 400 corrects the frequency h0 of the positioning terminal reference oscillator 89 using formula 12, multiplies the result by the constant α3 as illustrated in formula 13 in FIG. 16(e), and sets the search core frequency h7.

Here, if the frequency h0 of the positioning terminal reference oscillator 89 is not corrected, the accuracy of the search core frequency h7 decreases. In addition, if there is frequency error of the base stations 40A and the like, the accuracy of the search core frequency h7 decreases, even if the frequency h0 of the positioning terminal reference oscillator 89 is corrected using the transmitting radio waves C1 and the like from the base stations 40A and the like. At this point, the positioning terminal 80 corrects the frequency h0 of the positioning terminal reference oscillator 89 using the transmitting radio waves C1 and the like from the base stations 40A and the like, and also eliminates the frequency error (supply purpose base station error err3av) of the base stations 40A and the like. This increases the accuracy of the search core frequency h7. This allows the positioning terminal 80 to receive the radio waves G1 and the like from the GPS satellites 12a and the like earlier.

In addition, since there are multiple terminals 20A and the like as described above, the base stations 40A and the like can receive the base station error information 164 (see FIG. 6) from any of the terminals 20A and the like, and thus the opportunity to receive the base station error information 164 increases. Therefore, the opportunity for the positioning terminal 80 to obtain the base station side supply purpose base station error information 256 from the base stations 40A and the like also increases.

Moreover, the management server 60 averages the multiple pieces of base station error information, thereby generating supply purpose base station error information 354 (see FIG. 12) to be used by the positioning terminal 80 to capture the radio waves G1 and the like from the GPS satellites 12a and the like. This allows, for example, reduction in variation in the base station frequency errors err3 due to the elapsed time by averaging the base station errors err3 indicated in the multiple pieces of base station error information 146 sent from a single terminal 20A, and reduction in variation in the base station frequency errors err3 due to individual variability of each of the terminals 20A and the like by averaging the base station errors err3 indicated in multiple pieces of base station error information 164 sent from the multiple terminals 20A and the like.

This allows provision of the supply purpose base station error information 354 (see FIG. 12) capable of further effectively preventing increase in the time to capture the radio waves G1 and the like.

The positioning system 10 is configured as described above.

As described above, the terminals 20A and the like can generate the first error information 156 (see FIG. 6). The first error information 156 reflects both the frequency error of the base stations 40A and the like and that of the terminals 20A and the like.

In addition, the terminals 20A and the like can generate the second error information 162 (see FIG. 6). It can be considered that there is no frequency error of the geostationary satellite radio waves S of the geostationary satellite 14 since it is managed with high accuracy. Moreover, unless the terminals 20A and the like move, there is no relative movement between the geostationary satellite 14 and the terminals 20A and the like, and thus no Doppler shift of the frequency of the geostationary satellite radio waves S occurs. Accordingly, the second error information 162 reflects only the frequency error of the terminals 20A and the like.

The terminals 20A and the like can also generate the base station error information 164. As described above, the first error information 156 reflects both the frequency error of the base stations 40A and the like and that of the terminals 20A and the like. The second error information 162 reflects only the frequency error of the terminals 20A and the like. This allows calculation of frequency error of the transmitting radio waves C1 and the like of the base stations 40A and the like based on the first error information 156 and the second error information 162, and generation of the base station error information 164.

The terminals 20A and the like can then transmit the base station error information 164 to the base stations 40A and the like.

The base station error information 164 is statistically processed by the management server 60, and the supply purpose base station error information 354 (see FIG. 12) is thereby generated. The supply purpose base station error information 354 can be received by the base stations 40A and the like.

Accordingly, the positioning terminal 80 becomes able to obtain the supply purpose base station error information 354 (base station side supply purpose base station error information 256), and thus can prevent increase in the time to capture satellite radio waves due to the transmitting radio waves of the base stations 40A and the like with frequency error.

In other words, the positioning terminal 80 can generate frequency error information 458 (see FIG. 15). The frequency error information 458 reflects both the frequency error of the base stations 40A and the like and that of the positioning terminal 80.

In addition, the positioning terminal 80 can correct the frequency error of the positioning terminal reference oscillator 89 (see FIG. 5) of the positioning terminal 80 based on the positioning terminal side supply purpose base station error information 460 (see FIG. 15) and the frequency error information 458. As described above, the positioning terminal side supply purpose base station error information 460 is information indicating the frequency error of the radio waves C1 of the base stations 40A and the like. The frequency error information 458 reflects both the frequency error of the base stations 40A and the like and that of the positioning terminal 80. This allows calculation of only the frequency error of the positioning terminal 80 and correction of the frequency error of the positioning terminal reference oscillator 89 based on the positioning terminal side supply purpose base station error information 460 and the frequency error information 458.

Here, in the case of correcting the frequency error of the positioning terminal reference oscillator 89 based on only the frequency error information 458, the effects of the frequency error of the base stations 40A and the like cannot be reduced. Alternatively, in the case of correcting the frequency error of the positioning terminal reference oscillator 89 based on the positioning terminal side supply purpose base station error information 460 and the frequency error information 458, the effects of the frequency error of the base stations 40A and the like can be reduced.

This allows the positioning terminal 80 to prevent increase in the time to capture the radio waves G1 and the like due to the transmitting radio waves C1 and the like of the base stations 40A and the like with frequency error.

The structure of the positioning system 10 in the embodiment according to the invention is described above. The operation example is hereinafter described mainly using FIGS. 17, 18, and 19.

Figure 17:
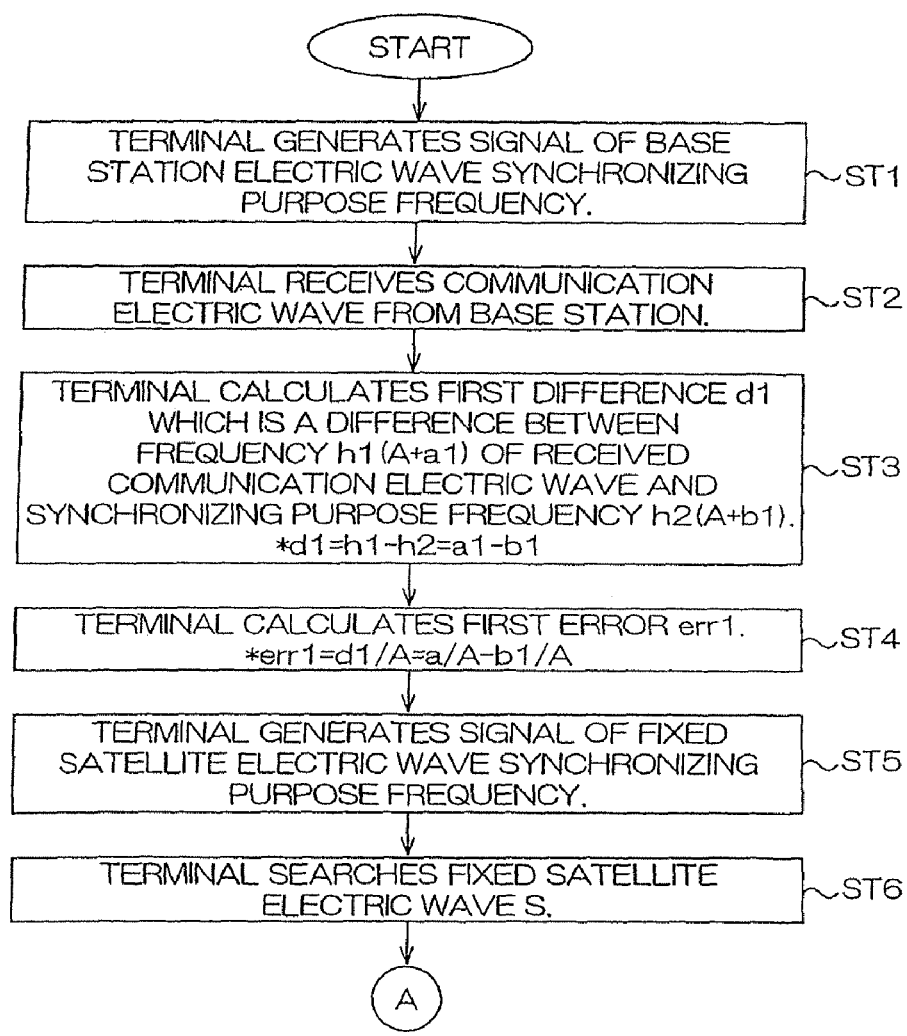
FIG. 17 schematically shows a flowchart of an operation example of the positioning system.
Figure 18:
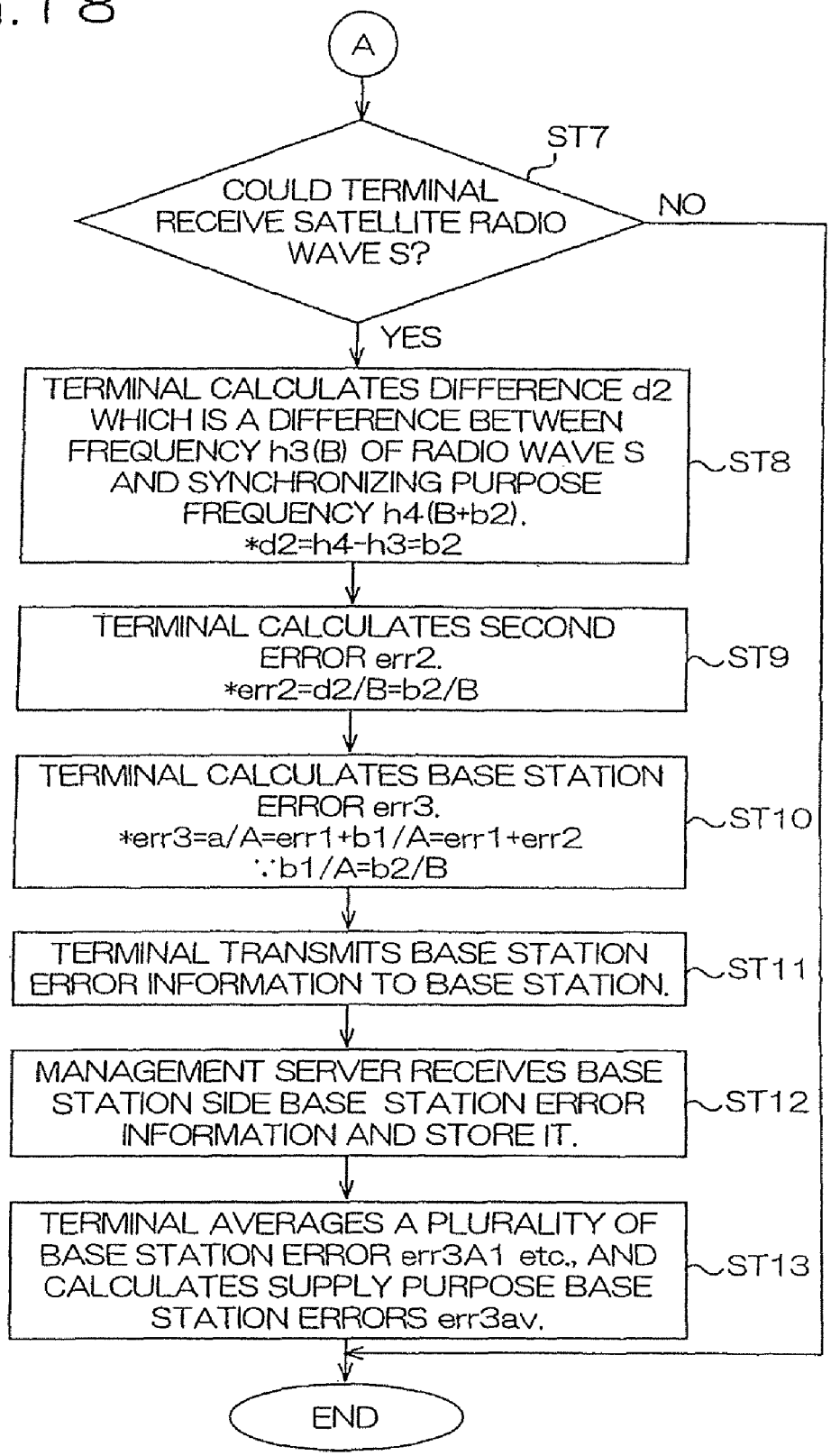
FIG. 18 schematically shows a flowchart of an operation example of the positioning system.
Figure 19:
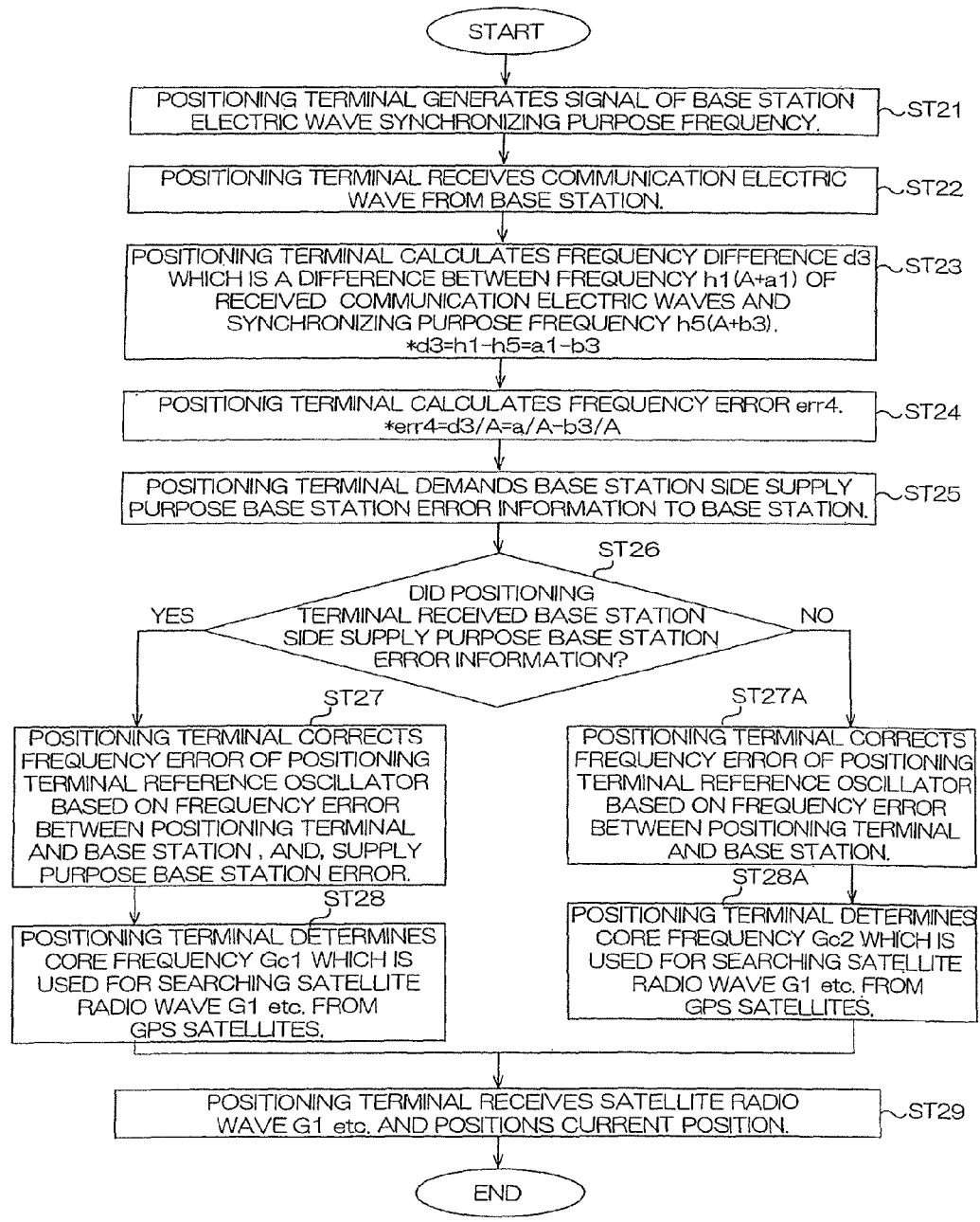
FIG. 19 schematically shows a flowchart of an operation example of the positioning system.

FIGS. 17, 18, and 19 schematically illustrates flowcharts of the operation example of the positioning system 10 according to the embodiment.

FIGS. 17 and 18 are flowcharts from generation of the base station error information 164 (see FIG. 6) regarding the base station 40A by means of the terminal 20A to generation of the supply purpose base station error information 354 by means of the management server 60. It should be noted that the following description assumes that the terminal 20A communicates with the base station 40A.

First, the terminal 20A generates a signal with frequency h2 (see FIGS. 1 and 7(a)) to receive the radio waves C1 of the base station 40A (step ST1 in FIG. 17). The step ST1 is an example of the step of generating base station synchronizing purpose frequency signals.

Subsequently, the terminal 20A receives the communication radio waves C1 from the base station 40A (step ST2). The step ST2 is an example of the step of receiving transmitting radio waves.

Next, the terminal 20A calculates the first difference d1 (see FIG. 6) which is the difference between the frequency h1 of the received radio waves C1 and the frequency h2 (step ST3). The step ST3 is an example of the step of generating base station and terminal difference information.

The terminal 20A then calculates the first error err1 (see FIG. 6) (step ST4). The step ST4 is an example of the step of generating base station and terminal error information.

Next, the terminal 20A generates a signal with the satellite radio wave synchronizing purpose frequency h4 (see FIGS. 1 and 10(a)) to receive the radio waves S of the geostationary satellite 14 (step ST5). The step ST5 is an example of the step of generating geostationary satellite synchronizing purpose frequency signals.

Afterwards, the terminal 20A searches the geostationary satellite radio waves S from the geostationary satellite 14 (step ST6). In step ST6, if the geostationary satellite radio waves S can be searched, the terminal 20A receives it. The step ST6 is an example of the step of receiving geostationary satellite radio waves.

Next, the terminal 20A determines whether or not the geostationary satellite radio waves S could be received (step ST7 in FIG. 18). If it determines that the geostationary satellite radio waves S could not be received, the process ends.

On the other hand, in step ST7, if the terminal 20A determines that the geostationary satellite radio waves S could be received, it calculates the second difference d2 (see FIG. 6) which is the difference between the frequency h3 (see FIG. 1) of the received geostationary satellite radio waves S and the geostationary satellite synchronizing purpose frequency h4 (step ST8). The step ST8 is an example of the step of generating geostationary satellite and terminal difference information.

The terminal 20A then calculates the second error err2 (see FIG. 6) (step ST9). The step ST9 is an example of the step of generating geostationary satellite and terminal error information.

The terminal 20A then calculates the base station error err3 (see FIG. 6) (step ST10). The step ST10 is an example of the step of generating base station frequency error information.

Next, the terminal 20A transmits the base station error information 164 (see FIG. 6) to the base station 40A (step ST11). The step ST11 is an example of the step of transmitting base station frequency error information.

Subsequently, the management server 60 receives and stores the base station side base station error information 254 (see FIG. 11) from the base station 40A (step ST12).

The management server 60 then averages the multiple base station errors err3A1 and the like, and calculates the supply purpose base station error err3av (step ST13).

Next, a flow of positioning performed by the positioning terminal 80 is described using FIG. 19.

It should be noted that the following description assumes that the positioning terminal 80 communicates with the base station 40A.

First, the positioning terminal 80 generates the base station synchronizing purpose frequency h5 (see FIG. 16(a)) to synchronize with the base station 40A (step ST21 in FIG. 19).

Subsequently, the positioning terminal 80 receives the radio waves C1 from the base station 40A (step ST22).

The positioning terminal 80 then calculates the frequency difference d3 (step ST23).

Next, the positioning terminal 80 calculates the frequency error err4 (step ST24).

Subsequently, the positioning terminal 80 requests the base station side supply purpose base station error information 256 (see FIG. 11) to the base station 40A (step ST25). The base station 40A requests the supply purpose base station error information 354 to the management server 60 in response to the request from the positioning terminal 80, and receives it.

Next, the positioning terminal 80 determines whether or not the base station side supply purpose base station error information 256 has been received (step ST26). If it determines that the base station side supply purpose base station error information 256 has been received, the positioning terminal 80 corrects the frequency error of the positioning terminal reference oscillator 89 (see FIG. 5) based on the frequency error err4 and the supply purpose base station error err3av (step ST27) (see FIG. 16(d)).

Afterwards, the positioning terminal 80 determines a core frequency Gc1 to search the satellite radio waves G1 and the like from the GPS satellites 12a and the like (step ST28).

The positioning terminal 80 then receives the satellite radio waves G1 and the like from the GPS satellites 12a and the like and positions a current position (step ST29).

The aforementioned steps allow the positioning terminal 80 to prevent increase in the time to capture the radio waves G1 and the like due to the transmitting radio waves C1 and the like of the base stations 40A and the like with frequency error.

It should be noted that if the positioning terminal 80 determines that the base station side supply purpose base station error information 254 has not been received in the aforementioned step ST26, the positioning terminal 80 corrects the frequency error of the positioning terminal reference oscillator 89 (see FIG. 5) based on the frequency error err4 (step ST27A).

Next, the positioning terminal 80 determines a core frequency Gc2 to search the satellite radio waves G1 and the like from the GPS satellites 12a and the like (step ST28A).

When the process proceeds to the steps ST27A and ST28A, the core frequency Gc2 itself has an error due to the frequency error of the transmitting radio waves C1 and the like of the base stations 40A and the like. Therefore, it takes longer time to capture the satellite radio waves S1 and the like than the case where the process proceeds to the steps ST27 and ST28. However, it is possible to reduce the time to capture the radio waves G1 and the like shorter than the case where the frequency error of the positioning terminal reference oscillator 89 (see FIG. 5) is never corrected.

Second Embodiment

Next, second embodiment is described.

Since a structure of a positioning system 10A (see FIG. 1) in the second embodiment is almost the same as that of the above-mentioned positioning system 10 in the first embodiment, the same reference numerals are used for the same or similar parts, and thus description thereof is omitted. The differences are hereinafter mainly described.

A software structure of base station error calculating terminals (hereinafter, referred to as terminals) 20A1 through 20D1 of the positioning system 10A is different from the first embodiment.

It should be noted that the following description assumes that a terminal 20A1 communicates with a base station 40A.

Figure 20:
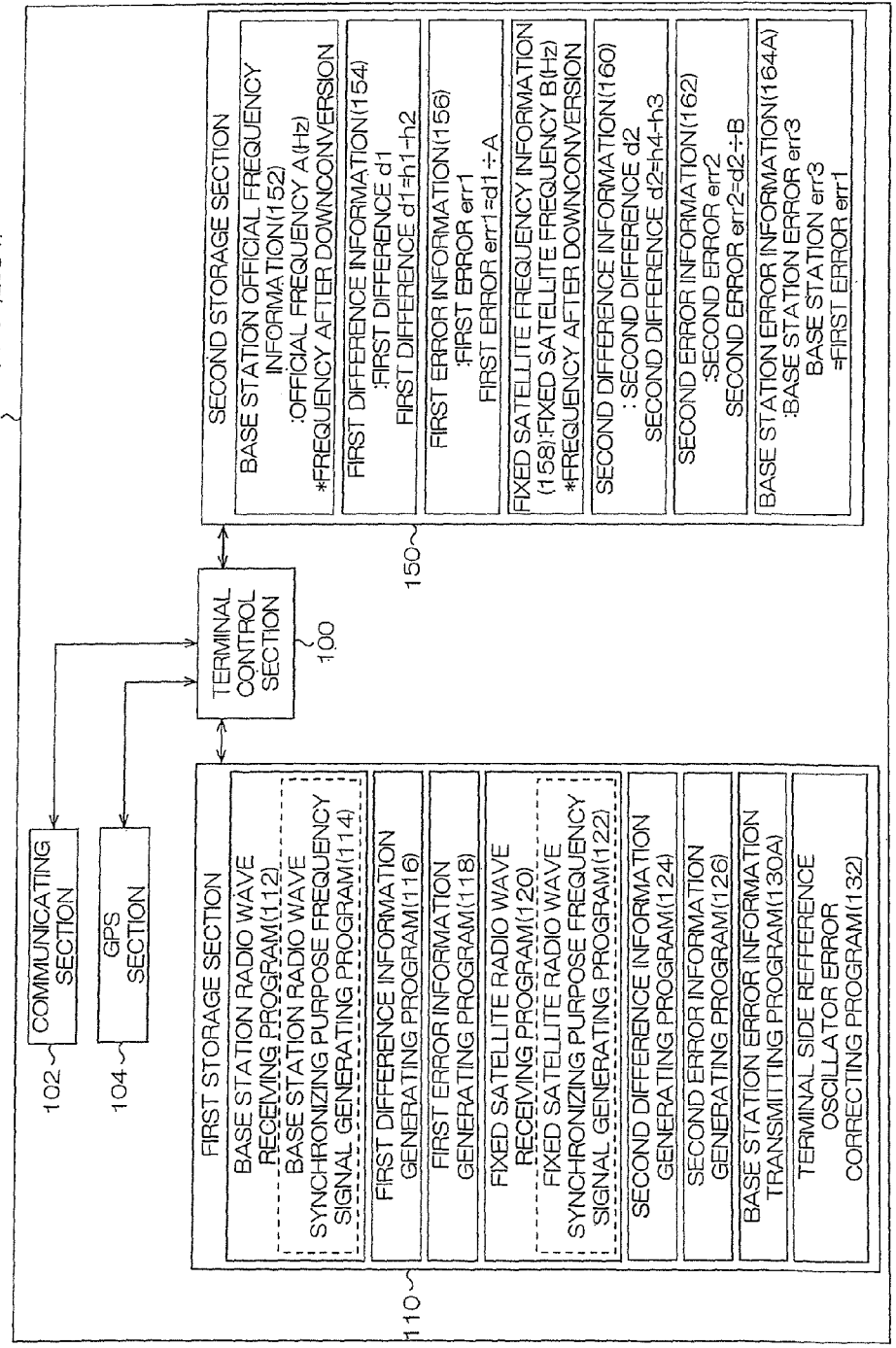
FIG. 20 schematically shows a main software structure of the terminal.

FIG. 20 schematically illustrates a main software structure of the terminal 20A1. It should be noted that main software structures of terminals 20B1 through 20D1 are the same as that of the terminal 20A1, and thus description thereof is omitted.

As illustrated in FIG. 20, the terminal 20A1 stores a terminal side reference oscillator error correcting program 132 in a first storage section 110. The terminal side reference oscillator error correcting program 132 is a program that a terminal control section 100 corrects frequency error of a terminal reference oscillator 29 based on second error information 162. In other words, the terminal side reference oscillator error correcting program 132 and the terminal control section 100 is an example of frequency error correcting means.

FIG. 21 is a diagram for describing the terminal side reference oscillator error correcting program 132.

The terminal control section 100 corrects frequency of an oscillation frequency of the terminal reference oscillator 29 by multiplying an oscillation frequency h0 of the terminal reference oscillator 29 by (1—err2) as illustrated in formula 14, for example, to reduce deviation from the reference frequency.

First, the terminal 20A1 calculates a second error err2 as described above. Subsequently, the terminal 20A1 corrects the frequency of the oscillation frequency of the terminal reference oscillator 29, and then calculates a first error err1. In this way, in the terminal 20A1, an error of the terminal 20A1 has been reduced before calculation of the first error err1. Accordingly, as is apparent from formula 3 (see FIG. 9(b)), the first error err1 indicates a/A, that is, a base station error err3.

The terminal control section 100 transmits information (first error information 156) which indicates the first error err1 to the base station 40A as information which indicates the base station error err3 using a base station error information transmitting program 130A. In other words, the base station error information transmitting program 130A and the terminal control section 100 is an example of base station error information transmitting means.

The terminal 20A1 is configured as described above.

First, the terminal 20A1 can generate second error information 162. The second error information 162 reflects only frequency error of the terminal 20A1.

The terminal 20A1 can also correct frequency error of the terminal reference oscillator 29 based on the second error information 162.

In addition, the terminal 20A1 can generate the first error information 156. As described above, since the frequency error of the terminal reference oscillator 29 can be corrected using the second error information 162, it is possible to make the first error information 156 reflect only the frequency error of the base station 40A.

The terminal 20A1 can then transmit the first error information 156 to the base station 40A as base station error information 164A.

The base station error information 164A is statistically processed by the management server 60, and supply purpose base station error information 354 (see FIG. 12) is thereby generated. The supply purpose base station error information 354 can be received by the base stations 40A and the like.

Accordingly, the positioning terminal 80 becomes able to obtain the supply purpose base station error information 354 (base station side supply purpose base station error information 256), and it is possible to prevent increase in the time to capture satellite radio waves due to the transmitting radio waves of the base stations 40A and the like with frequency error.

The structure of the positioning system 10A in the embodiment according to the invention is described above. The operation example is hereinafter described mainly using FIGS. 22 and 23.

Figure 23:
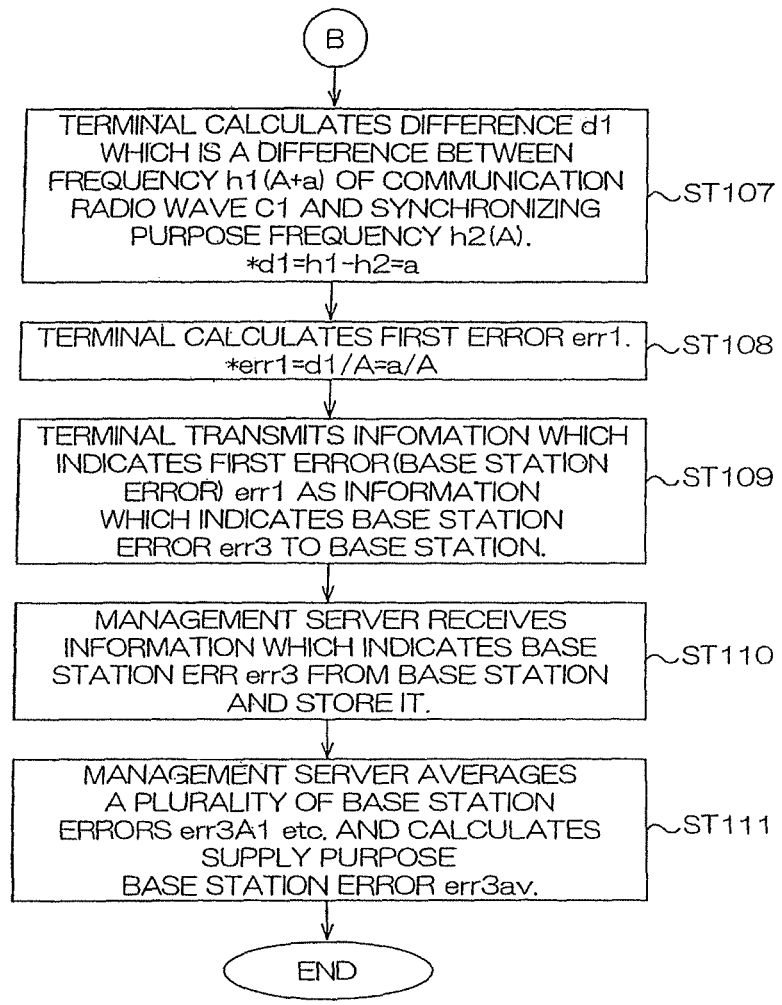
FIG. 23 schematically shows a flowchart of an operation example of the positioning system.

FIGS. 22 and 23 schematically illustrate flowcharts of the operation example of the positioning system 10A according to the embodiment.

FIG. 22 is a flowchart from generation of the base station error information 164 (see FIG. 20) regarding the base station 40A by means of the terminal 20A1 to generation of the supply purpose base station error information 354 by means of the management server 60. It should be noted that the following description assumes that the terminal 20A1 communicates with the base station 40A.

First, the terminal 20A1 generates a signal with geostationary satellite synchronizing purpose frequency h4 (step ST101 in FIG. 22). The step ST101 is an example of the step of generating geostationary satellite synchronizing purpose frequency signals.

Subsequently, the terminal 20A1 receives geostationary satellite radio waves S (step ST102). The step ST102 is an example of the step of receiving geostationary satellite radio waves.

Next, the terminal 20A1 calculates a second difference d2 (step ST103). The step ST103 is an example of the step of generating geostationary satellite and terminal difference information.

The terminal 20A1 then calculates a second error err2 (step ST104). The step ST104 is an example of the step of generating geostationary satellite error information.

Afterwards, the terminal 20A1 corrects an error of the terminal side reference oscillator 29 (see FIG. 2), and generates a signal with base station synchronizing purpose frequency h2 (step ST105). The step ST105 is an example of the step of correcting frequency errors, and is also an example of the step of generating base station synchronizing purpose frequency signals.

The terminal 20A1 then receives a radio waves C1 from the base station 40A (step ST106). The step ST106 is an example of the step of receiving transmitting radio waves.

Next, the terminal 20A1 calculates a first difference d1 (step ST107 in FIG. 23). The step ST107 is an example of the step of generating base station and terminal difference information.

Subsequently, the terminal 20A1 calculates a first error err1 (step ST108). The step ST108 is an example of the step of generating base station and terminal error information.

The terminal 20A1 then transmits information indicating the first error err1 to the base station 40A as information indicating the base station error err3 (step ST109). The step ST109 is an example of the step of transmitting base station error information.

Next, the management server 60 receives and stores information indicating the base station error err3 from the base station 40A (step ST110).

The management server 60 then averages the multiple base station errors err3A1 and the like, and calculates a supply purpose base station error err3av (step ST111).

The aforementioned steps allow the positioning terminal 80 to obtain the supply purpose base station error information 354 (base station side supply purpose base station error information 256), and prevention of increase in the time to capture satellite radio waves due to the transmitting radio waves of the base stations 40A and the like with frequency error.

Program and Computer Readable Recording Medium and the Like

It is possible to provide a control program for a terminal apparatus instructing a computer to perform the steps of generating base station synchronizing purpose frequency signals, receiving transmitting radio waves, generating base station and terminal difference information, generating base station and terminal error information, generating geostationary satellite synchronizing purpose frequency signals, receiving geostationary satellite radio waves, generating geostationary satellite and terminal difference information, generating geostationary satellite and terminal error information, generating base station frequency error information, transmitting base station frequency error information, and the like of the aforementioned operation example.

It is also possible to provide a computer readable recording medium and the like on which such control program and the like for the terminal apparatus are recorded.

In addition, it is possible to provide a control program for a terminal apparatus instructing a computer to perform the steps of generating geostationary satellite synchronizing purpose frequency signals, receiving geostationary satellite radio waves, generating geostationary satellite and terminal difference information, generating geostationary satellite and terminal error information, correcting frequency errors, generating base station synchronizing purpose frequency signals, receiving transmitting radio waves, generating base station and terminal difference information, generating base station and terminal error information, transmitting base station frequency error information, and the like of the aforementioned operation example.

It is also possible to provide a computer readable recording medium and the like on which such control program and the like for the terminal apparatus are recorded.

A program storing medium used to install such control program and the like for the terminal apparatus on the computer, and enable them to be performed by the computer may be not only a package medium such as a flexible disc such as a floppy(R), a CD-ROM (Compact Disc Read Only Memory), a CD-R (Compact Disc Recordable), a CD-RW (Compact Disc-Rewritable), a DVD (Digital Versatile Disc) or the like, but also a semiconductor memory, a magnetic disc, or a magnetic optical disc in which a program is temporarily or permanently stored.

The present invention is not limited to the above-described respective embodiments. Further, the above-described respective embodiments may be combined with each other.

What is claimed is:

1. A positioning method comprising:
generating at a terminal a GS(geostationary-satellite)-synchronizing frequency to receive a geostationary-satellite signal, the geostationary-satellite signal being transmitted from a geostationary-satellite on a geostationary-satellite frequency;
receiving at the terminal the geostationary-satellite signal on a GS(geostationary-satellite)-receiving frequency;
calculating at the terminal a GST(geostationary-satellite and Terminal) frequency difference, the GST frequency difference being a difference between the GS-receiving frequency and the GS-synchronizing frequency;
obtaining at the terminal an GS ratio, the GS ratio being a ratio of the GST frequency difference to the geostationary-satellite frequency;
correcting at the terminal a frequency error of a reference oscillator of the terminal based on the GS ratio,
generating at the terminal a BS(Base Station)-synchronizing frequency to receive a base-station signal from a communication base station, the base-station signal being transmitted on an official frequency of the communication base station;
receiving at the terminal the base-station signal on a BS-receiving frequency;
calculating at the terminal a BST(Base Station and Terminal) frequency difference, the BST frequency difference being a difference between the BS-receiving frequency and the BS-synchronizing frequency;
obtaining at the terminal a BS ratio, the BS ratio being a ratio of the BST frequency difference to the official frequency;
transmitting the BS ratio as a BS frequency error ratio from the terminal to the communication base station, the BS frequency error ratio being a ratio of a BS frequency error to the official frequency of the base-station signal, the BS frequency error being a difference between the official frequency and a frequency of the base-station signal;
transmitting the BS frequency error ratio from the communication base station to a positioning device; and
calculating at the positioning device a position of the positioning device by receiving a satellite signal on a frequency accounting for the BS frequency error.

2. The positioning method according to claim 1, wherein the calculating the GST frequency difference may be calculating a difference between the GS-receiving frequency and a frequency generated at the terminal to receive the geostationary-satellite frequency.

3. A positioning system, comprising:
a communication base station;
a terminal; and
a positioning device; wherein
the terminal includes,
a GS frequency generator that generates a GS-synchronizing frequency to receive a geostationary-satellite signal, the geostationary-satellite signal being transmitted from a geostationary-satellite on a geostationary-satellite frequency, a GS signal receiver that receives the geostationary-satellite signal on a GS-receiving frequency, an GST difference generator that generates an GST difference, the GST difference between the GS-receiving frequency and the GS-synchronizing frequency, an GS ratio determinator that determines an GS ratio, the GS ratio being a ratio of the GST difference to the frequency of the geostationary-satellite signal, a frequency error corrector that corrects a frequency error of a reference oscillator of the terminal based on the GS ratio, a BS frequency generator that generates a BS-synchronizing frequency to receive a base station signal from a communication base station, the base-station signal being transmitted on an official frequency of the communication base station, a BS signal receiver that receives a base station signal on a BS-receiving frequency, a BST difference generator that generates a BST difference, the BST difference between a the BS-receiving signal and the BS-synchronizing frequency, a BS ratio determinator that determines a BS ratio, the BS ratio being a ratio of the BST difference and the official frequency, and a transmitter that transmits the BS ratio as a BS frequency error ratio to the communication base station, the BS frequency error ratio being a ratio of a BS frequency error to the official frequency of the base-station signal, the BS frequency error being a difference between the official frequency and a frequency of the base-station signal, the communication base station including,
a transmitter that transmits the BS frequency error ratio to the positioning device, the positioning device including,
a BS frequency generator that generates a BS-synchronizing frequency to receive a base station signal from a communication base station, the base station signal being transmitted at an official frequency of the communication base station, a BS signal receiver that receives the base station signal on a BS-receiving frequency, a BSPD difference generator that generates a BSPD difference, the BSPD difference between the BS-receiving signal and the BS-synchronizing frequency, a PD ratio determinator that determines a PD ratio, the PD ratio being a ratio of the BSPD difference to the official frequency, a receiving section that receives the BS frequency error ratio from the communication base station, an adjusting section that adjusts frequency of a reference oscillator of the positioning device based on the BS frequency error ratio and the PD ratio, and a GPS receiver adapted to receive a satellite signal using the adjusted frequency.

4. The positioning system according to claim 3, wherein the GST difference generator may calculate a difference between the GS-receiving frequency and a frequency generated at the terminal to receive the geostationary-satellite frequency.

5. A terminal comprising:

a GS frequency generator that generates a GS-synchronizing frequency to receive a geostationary-satellite signal, the geostationary-satellite signal being transmitted from a geostationary-satellite on a geostationary-satellite frequency, a GS signal receiver that receives the geostationary-satellite signal on a GS-receiving frequency, an GST difference generator that generates an GST difference, the GST difference between the GS-receiving frequency and the GS-synchronizing frequency, an GS ratio determinator that determines an GS ratio, the GS ratio being a ratio of the GST difference to the frequency of the geostationary-satellite signal, a frequency error corrector that corrects a frequency error of a reference oscillator of the terminal based on the GS ratio, a BS frequency generator that generates a BS-synchronizing frequency to receive a base station signal from a communication base station, the base-station signal being transmitted on an official frequency of the communication base station, a BS signal receiver that receives a base station signal on a BS-receiving frequency, a BST difference generator that generates a BST difference, the BST difference between a the BS-receiving signal and the BS-synchronizing frequency, a BS ratio determinator that determines a BS ratio, the BS ratio being a ratio of the BST difference and the official frequency, and a transmitter that transmits the BS ratio as a BS frequency error ratio to the communication base station, the BS frequency error ratio being a ratio of a BS frequency error to the official frequency of the base-station signal, the BS frequency error being a difference between the official frequency and a frequency of the base-station signal.

6. The terminal according to claim 5, wherein the GST difference generator may calculate a difference between the GS-receiving frequency and a frequency generated at the terminal to receive the geostationary-satellite frequency.

* * * * *